US011373393B2

(12) United States Patent
Redmon et al.

(10) Patent No.: US 11,373,393 B2
(45) Date of Patent: *Jun. 28, 2022

(54) IMAGE BASED OBJECT DETECTION

(71) Applicant: Apple Inc., Cupertino, CA (US)

(72) Inventors: Joseph Redmon, Seattle, WA (US); Ali Farhadi, Seattle, WA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/751,141

(22) Filed: Jan. 23, 2020

(65) Prior Publication Data

US 2020/0160087 A1  May 21, 2020

Related U.S. Application Data

(63) Continuation of application No. 15/852,650, filed on Dec. 22, 2017, now Pat. No. 10,579,897.

(Continued)

(51) Int. Cl.
 *G06K 9/46* (2006.01)
 *G06K 9/00* (2022.01)
 (Continued)

(52) U.S. Cl.
 CPC ......... *G06V 10/449* (2022.01); *G06K 9/6218* (2013.01); *G06K 9/6219* (2013.01); *G06K 9/6274* (2013.01); *G06K 9/6282* (2013.01); *G06V 10/10* (2022.01); *G06V 10/454* (2022.01); *G06V 10/56* (2022.01); *G06V 20/20* (2022.01); *G06V 20/35* (2022.01); *G06V 20/52* (2022.01)

(58) Field of Classification Search
 CPC ............. G06K 9/4619; G06K 9/00684; G06K 9/00771; G06K 9/20; G06K 9/4652; G06K 9/6218
 See application file for complete search history.

(56) References Cited

U.S. PATENT DOCUMENTS

2017/0330059 A1* 11/2017 Novotny ............ G06K 9/00664
2017/0344884 A1* 11/2017 Lin ..................... G06F 16/5854
2018/0121762 A1*  5/2018 Han ..................... G06K 9/4604

OTHER PUBLICATIONS

Pan et al, "Cascade Convolutional Neural Network Based on Transfer-Learning for Aircraft Detection on High-Resolution Remote Sensing Images," Jul. 27, 2017, Journal of Sensors, vol. 2017, 15 pages (Year: 2017).*

(Continued)

*Primary Examiner* — David F Dunphy
(74) *Attorney, Agent, or Firm* — BakerHostetler

(57) ABSTRACT

Systems and methods are disclosed for image-based object detection and classification. For example, methods may include accessing an image from an image sensor; applying a convolutional neural network to the image to obtain localization data to detect an object depicted in the image and to obtain classification data to classify the object, in which the convolutional neural network has been trained in part using training images with associated localization labels and classification labels and has been trained in part using training images with associated classification labels that lack localization labels; annotating the image based on the localization data and the classification data to obtain an annotated image; and storing, displaying, or transmitting the annotated image.

29 Claims, 11 Drawing Sheets

Related U.S. Application Data

(60) Provisional application No. 62/566,744, filed on Oct. 2, 2017.

(51) Int. Cl.
| | |
|---|---|
| *G06K 9/62* | (2022.01) |
| *G06K 9/20* | (2006.01) |
| *G06V 10/44* | (2022.01) |
| *G06V 10/10* | (2022.01) |
| *G06V 10/56* | (2022.01) |
| *G06V 20/20* | (2022.01) |
| *G06V 20/00* | (2022.01) |
| *G06V 20/52* | (2022.01) |

(56) References Cited

OTHER PUBLICATIONS

Bell, et al., Inside-Outside Net: Detecting Objects in Context with Skip Pooling and Recurrent Neural Networks, arXiv:1512.04143v1, Dec. 14, 2015, 11 pages.
Darknet: Open Source Neural Networks in C, 2 pages.
Deng, et al., ImageNet: A Large-Scale Hierarchical Image Database, Conference Paper in Proceedings I CVPR, IEEE Computer Society Conference on Computer Vision and Pattern Recognition. IEEE Computer Society Conference on Computer Vision and Patten Recognition, Jun. 2009, 9 pages.
Discriminatively Trained Deformable Part Models, available at http://cs.brown.edu/people/pfelzens/latent-release4/, Version 4, Apr. 21, 2010, 3 pages.
Everingham, et al., The Pascal Visual Object Classes (VOC) Challenge, International Journal of Computer Vision, 34 pages.
Girshick, Fast R-CNN, arXiv:15n4.08083v2 [cs.CV1], Sep. 27, 2015, 9 pages.
He, et al., Deep Residual Learning for Image Recognition, arXiv:1512.03385v1, Dec. 10, 2015, 12 pages.
Krizhevsky, et al., ImageNet Classification with Deep Convolutional Neural Networks, University of Toronto, 9 pages.
Lin, et al., Microsoft COCO: Common Objects in Context, arXiv:1405.0312v3, Feb. 21, 2015, 15 pages.
Lin, et al., Network in Network, arXiv:1312.4400v3, Mar. 4, 2014, 10 pages.
Liu, et al., SSD: Single Shot MultiBox Detector, arXiv:1512.02325v5, Dec. 29, 2016, 17 pages.
Loff, et al., Batch Normalization: Accelerating Deep Network Training by Reducing Internal Covariate Shift, arXiv:1502.03167v3, Mar. 2, 2015, 11 pages.
Miller, et al., Introduction to WordNet: An On-line Lexical Database, Aug. 1993, 86 pages.
Redmon, et al., You Only Look Once: Unified, Real-Thee Object Detection, arXiv:1506.02640v5, May 9, 2016, 10 pages.
Ren, et al., Faster R-CNN: Towards Real-Time Object Detection with Region Proposal Networks, arXiv:1506.01497v3, Jan. 6, 2016, 14 pages.
Russakovsky, et al., ImageNet Large Scale Visual Recognition Challenge, arXiv:1409.0575v3, Jan. 30, 2015, 43 pages.
Simonyan, et al., Very Deep Convolutional Networks for Large-Scale Image Recognition, conference paper at ICLR 2015, arXiv:1409.1556v6, Apr. 10, 2015, 14 pages.
Szegedy, et al., Going deeper with convolutions, arXiv:1409.4842v1, Sep. 17, 2014, 12 pages.
Szegedy, et al., Inception-v4, Inception-ResNet and the Impact of Residual Connections on Learning, arXiv:1602.07/61v2, Aug. 23, 2016, 12 pages.
Thomee, et al., YFCC100M: The New Data in Multimedia Research, arXiv:1503.01817v2, Apr. 25, 2016, 8 pages.

\* cited by examiner

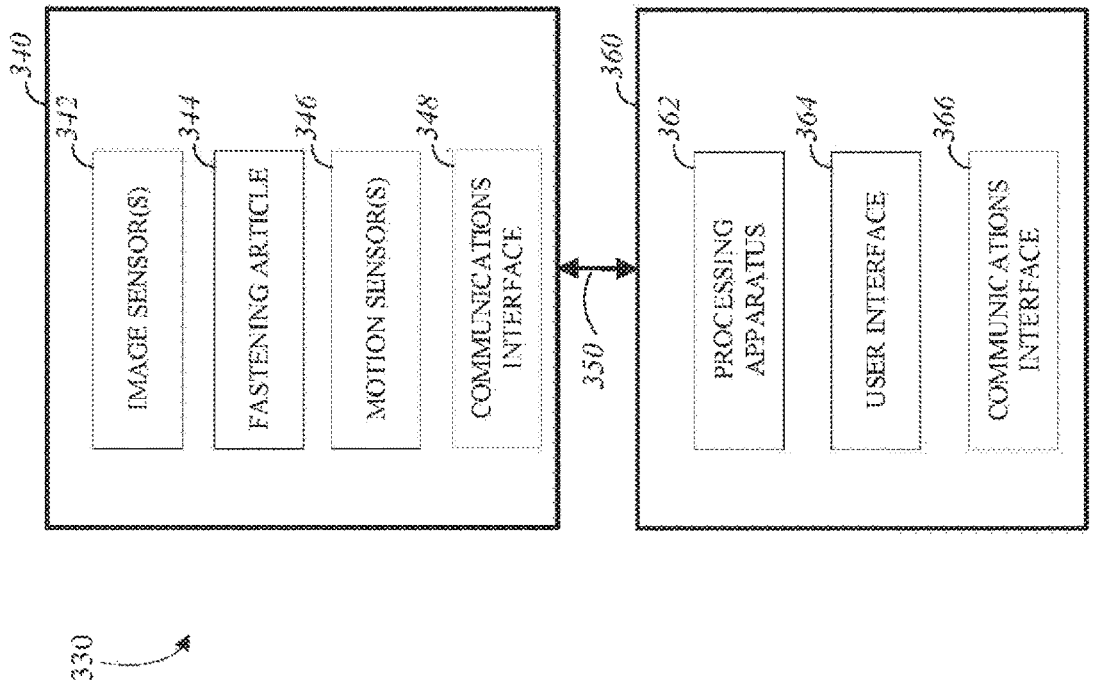
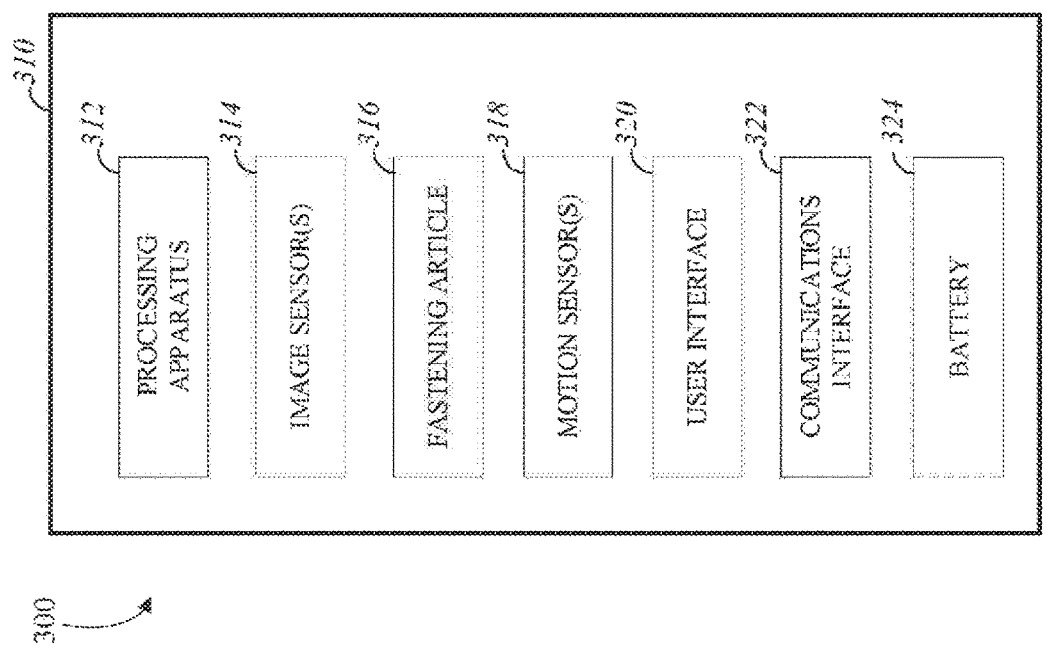

IMAGE BASED OBJECT DETECTION

CROSS REFERENCE TO RELATED APPLICATIONS

This application is a continuation of U.S. application Ser. No. 15/852,650, filed Dec. 22, 2017, which claims the benefit of U.S. Provisional Application No. 62/566,744, filed Oct. 2, 2017, the contents of both of which are incorporated by reference herein in their entirety.

TECHNICAL FIELD

This disclosure relates to image-based object detection and classification.

BACKGROUND

Machine learning techniques, including neural networks, have been applied to some computer vision problems. Neural networks have been trained to classify images using large datasets including millions of images with ground truth labels. Region-based convolutional neural networks have been applied to the problem of detecting objects within an image.

SUMMARY

Disclosed herein are implementations of image-based object detection and classification.

In a first aspect, the subject matter described in this specification can be embodied in systems that include an image sensor configured to capture an image, and a processing apparatus that is configured to: access the image from the image sensor; apply a convolutional neural network to the image to obtain localization data to detect an object depicted in the image and to obtain classification data to classify the object, in which the convolutional neural network has been trained in part using training images with associated localization labels and classification labels and has been trained in part using training images with associated classification labels that lack localization labels; and annotate the image based on the localization data and the classification data.

In a second aspect, the subject matter described in this specification can be embodied in methods that include accessing an image from an image sensor; applying a convolutional neural network to the image to obtain localization data to detect an object depicted in the image and to obtain classification data to classify the object, in which the convolutional neural network has been trained in part using training images with associated localization labels and classification labels and has been trained in part using training images with associated classification labels that lack localization labels; annotating the image based on the localization data and the classification data to obtain an annotated image; and storing, displaying, or transmitting the annotated image.

In a third aspect, the subject matter described in this specification can be embodied in methods for training a convolutional neural network for object detection and classification that include training the convolutional neural network using training images with associated localization labels and classification labels, wherein the convolutional neural network outputs localization data and classification data based on an image that is input to the convolutional neural network; training the convolutional neural network using training images with associated classification labels that lack localization labels; and storing or transmitting the convolutional neural network.

These and other aspects of the present disclosure are disclosed in the following detailed description, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 3A is a block diagram of an example of a system configured for image capture with object detection and classification.

FIG. 3B is a block diagram of an example of a system configured for image capture with object detection and classification.

DETAILED DESCRIPTION

Figure 1:
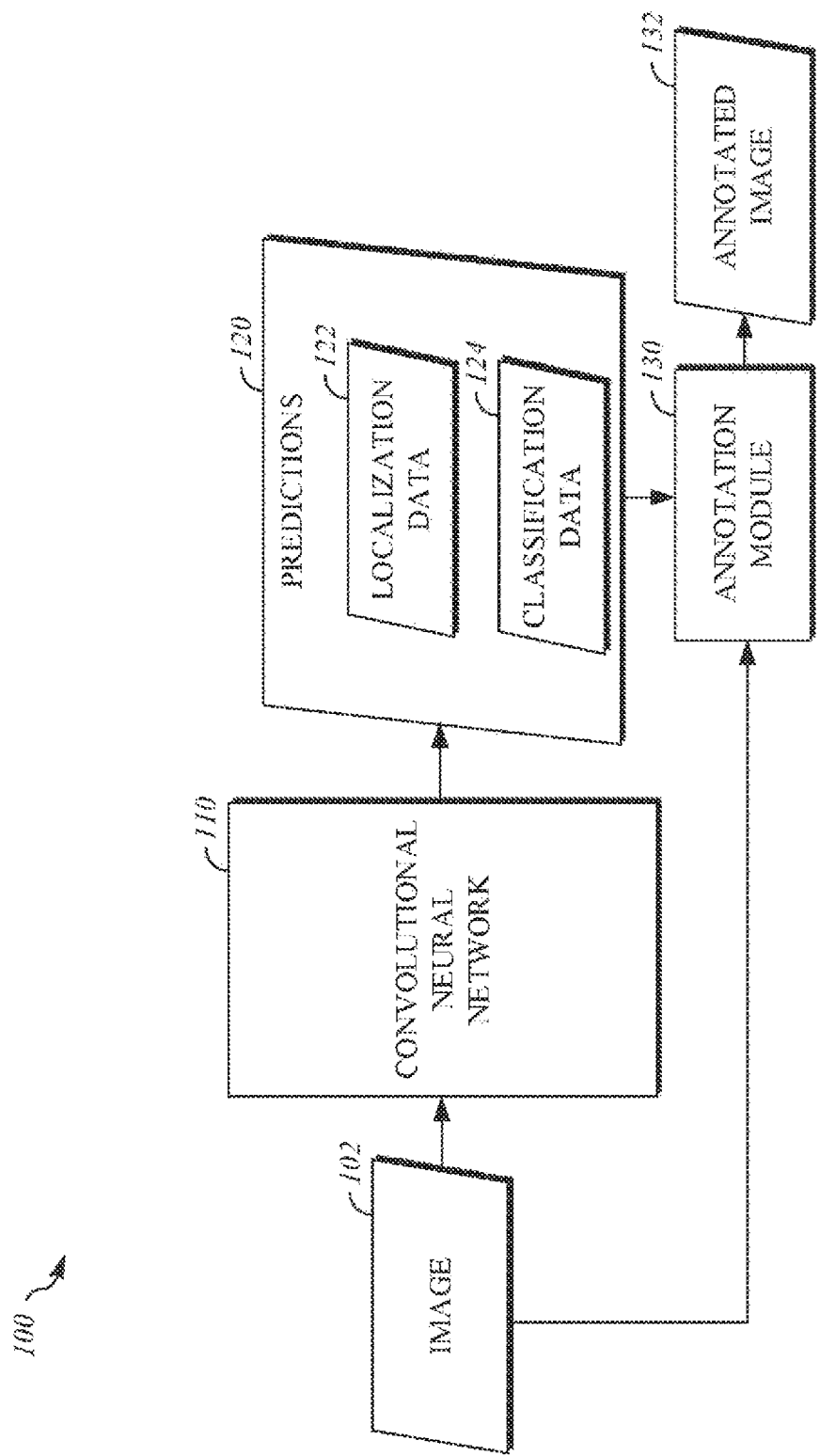
FIG. 1 is a block diagram of a system for detection and classification of objects appearing in images.

This document includes disclosure of systems and methods for image-based object detection and classification. Object detection and classification systems should be fast, accurate, and able to recognize a wide variety of objects. Since the introduction of neural networks, detection frameworks have become increasingly fast and accurate. However, most detection methods are still constrained to a small set of objects.

Current object detection datasets are limited compared to datasets for other tasks like classification and tagging. The most common detection datasets contain thousands to hundreds of thousands of images with dozens to hundreds of tags. Classification datasets have millions of images with tens or hundreds of thousands of categories or classes of objects.

It would be desirable to increase the size of detection datasets to the level of object classification datasets. However, labelling images for detection is far more expensive than labelling for classification or tagging (e.g., tags are often user-supplied for free). Thus, detection datasets on the same scale as classification datasets are unlikely to become available in the near future.

Proposed herein are methods and systems to harness the large amount of classification data already available and use them to expand the scope and accuracy of current object detection systems. Some implementations use a hierarchical view of object classification that enables the combination of distinct datasets together for training of convolutional neural networks for object detection and classification. A joint training algorithm is introduced that enables training of object detectors on both detection and classification data. Some implementations leverage labeled detection images to learn to precisely localize objects while using classification images to increase an object vocabulary and robustness. For example, a convolutional neural network may be trained to serve as a real-time object detector that can detect over 9000 different object categories. For example, dataset combination and a joint training algorithm may be used to train a model on more than 9000 classes from the ImageNet classification dataset as well as detection data from the COCO detection dataset.

The proposed convolutional neural networks provide a real-time framework for object detection of more object classes (e.g., 9000 classes) by jointly training detection and classification. A hierarchical tree of classes may be used to combine data from various sources. Images in an object detection dataset are typically associated with localization labels that provide ground truth about location and/or size of objects appearing in the images and also with classification labels that provide ground truth about the class of those objects appearing in the images. Images in an object classification dataset are typically associated with classification labels that provide ground truth about the class of an object appearing in the images, but they lack localization labels. A proposed joint training technique trains a convolutional neural network on both detection dataset images (e.g., from the COCO dataset) and classification dataset images (e.g., from the ImageNet dataset). The proposed convolutional neural networks help to close the dataset size gap between detection and classification.

Many of the techniques presented herein also generalize outside of object detection. The hierarchical tree of classes' representation of the set of ImageNet classes offers a richer, more detailed output space for image classification. Dataset combination using hierarchical classification would be useful in the classification and segmentation domains. Training techniques like multi-scale training could provide benefits across a variety of computer vision tasks. Similar techniques may be used for weakly supervised image segmentation. In some implementations, detection results may be further improved using more powerful matching strategies for assigning weak labels to classification data during training.

The proposed techniques and systems for image-based object detection and classification may offer advantages over conventional object detection and classification systems. For example, jointly training on object detection datasets and classification datasets may enable prediction of detections for object classes that lack labelled detection data. For example, using multi-scale training, the same convolutional neural network model can be applied to images at varying sizes or resolutions, providing a smooth tradeoff between speed and accuracy. Some implementations may provide high-accuracy detection and classification of objects appearing in an image, while meeting real-time processing constraints and/or the constraints of limited hardware platforms (e.g., wearable computing devices, such as augmented reality headsets).

Implementations are described in detail with reference to the drawings, which are provided as examples to enable those skilled in the art to practice the disclosed technology. The figures and examples are not meant to limit the scope of the present disclosure to a single implementation or embodiment, and other implementations and embodiments are possible by way of interchange of, or combination with, some or all of the described or illustrated elements. Wherever convenient, the same reference numbers will be used throughout the drawings to refer to same or like parts.

FIG. 1 is a block diagram of a system 100 for detection and classification of objects appearing in images. The system 100 includes a convolutional neural network 110 that may be trained with a diverse set of training images having different characteristics (e.g., different ground truth label formats and different resolutions). This design for the convolutional neural network 110 may enable the utilization of larger amounts of training data than other designs to achieve more robust detection and classification of large numbers of object types. For example, the system 100 may implement the process 400 of FIG. 4 to detect and classify objects appearing in an image. For example, the system 100 may be implemented as part of a processing apparatus (e.g., the processing apparatus 312 of FIG. 3A or the processing apparatus 362 of FIG. 3B) that is configured to detect and classify objects in images captured with one or more image sensors.

The system 100 includes a convolutional neural network 110 configured to be applied to an image 102 to determine predictions 120 that include localization data 122 indicating regions within the image that are likely to depict objects of interest and classification data 124 that identifies likely classes for the objects detected in the image. For example, the localization data 122 may include the specification of one or more bounding boxes that are constrained to be centered within a region of the image corresponding to a cell of a feature map for the image, and coordinates of the one or more bounding boxes within the region are predictions of the convolutional neural network 110 included in the localization data 122. The convolutional neural network 110 may also predict dimensions of a region (e.g., width and height of a bounding box), which may be included in the localization data 122. For example, the convolutional neural network 110 may predict a bounding box for an object as depicted and described in relation to FIG. 8. The convolutional neural network 110 may output classification data 124 including predictions that correspond to respective classes that are nodes in a hierarchical tree of classes (e.g., the hierarchical tree 1050 of FIG. 10B). For example, the convolutional neural network 110 may predict a classification for an object that has been detected as depicted and described in relation to FIG. 9.

The convolutional neural network 110 may provide accurate and fast detection to support applications such as robotics or self-driving cars, which rely on low latency predictions. The convolutional neural network 110 may be designed to be fast from the ground up. In some implementations, the convolutional neural network 110 may include mostly 3×3 filters and double the number of channels after pooling steps. The convolutional neural network 110 may utilize global average pooling to make predictions as well as 1×1 filters to compress the feature representation between 3×3 convolutions. The convolutional neural network 110 may utilize batch normalization to stabilize training, speed up convergence, and regularize the model. For example, the convolutional neural network 110 may include 19 convolutional layers and 5 maxpooling layers. For example, the convolutional neural network 110 may include the layers listed in Table 1. For example, the 125 filters in the output layer may correspond to 5 bounding boxes centered in a feature map cell region with 5 bounding box parameters (e.g., x offset, y offset, width, height, and likelihood of object) and a 20-tuple class prediction for each bounding box. A respective softmax function may be applied to the class prediction for each predicted region (e.g., bounding box). In some implementations, the convolutional neural network 110 includes a pass-through layer from the final 3×3×512 layer of Table 1 to the second-to-last convolutional layer in order to better utilize fine grain features. For example, the convolutional neural network 110 may be trained for 160 epochs with a starting learning rate of 0.001, dividing it by 10 at 60 and 90 epochs. For example, the convolutional neural network 110 may be trained with a weight decay of 0:0005 and momentum of 0:9. Data augmentation (e.g., random crops and color shifting) may be performed on a training dataset and used for training the convolutional neural network 110. For example, the convolutional neural network 110 may perform 5.58 billion operations to process an image yet achieves 72.9% top-1 accuracy and 91.2% top-5 accuracy on ImageNet.

TABLE 1

| Type | Filters | Size/Stride | Output |
|---|---|---|---|
| Convolutional | 32 | 3 × 3 | 224 × 224 |
| Maxpool |  | 2 × 2/2 | 112 × 112 |
| Convolutional | 64 | 3 × 3 | 112 × 112 |
| Maxpool |  | 2 × 2/2 | 56 × 56 |
| Convolutional | 128 | 3 × 3 | 56 × 56 |
| Convolutional | 64 | 1 × 1 | 56 × 56 |
| Convolutional | 128 | 3 × 3 | 56 × 56 |
| Maxpool |  | 2 × 2/2 | 28 × 28 |
| Convolutional | 256 | 3 × 3 | 28 × 28 |
| Convolutional | 128 | 1 × 1 | 28 × 28 |
| Convolutional | 256 | 3 × 3 | 28 × 28 |
| Maxpool |  | 2 × 2/2 | 14 × 14 |
| Convolutional | 512 | 3 × 3 | 14 × 14 |
| Convolutional | 256 | 1 × 1 | 14 × 14 |
| Convolutional | 512 | 3 × 3 | 14 × 14 |
| Convolutional | 256 | 1 × 1 | 14 × 14 |
| Convolutional | 512 | 3 × 3 | 14 × 14 |
| Maxpool |  | 2 × 2/2 | 7 × 7 |
| Convolutional | 1024 | 3 × 3 | 7 × 7 |
| Convolutional | 512 | 1 × 1 | 7 × 7 |
| Convolutional | 1024 | 3 × 3 | 7 × 7 |
| Convolutional | 512 | 1 × 1 | 7 × 7 |
| Convolutional | 1024 | 3 × 3 | 7 × 7 |
| Convolutional | 1024 | 3 × 3 | 7 × 7 |
| Convolutional | 1024 | 3 × 3 | 7 × 7 |
| Convolutional | 1024 | 3 × 3 | 7 × 7 |
| Convolutional Softmax | 125 | 1 × 1 | 7 × 7 |

In some implementations, a portion of the convolutional neural network 110 may be modified for training with classification data. For example, the last 4 convolutional layers of the neural network of Table 1 may be replaced by a 1×1 convolutional layer with a number of filters matching the number of classes in the training image dataset (e.g., 1000 classes/filters for ImageNet) with an average pooling layer and a softmax function over the classes. For example, this modified convolutional neural network may be trained with the ImageNet 1000-class classification dataset for 160 epochs using stochastic gradient descent with a starting learning rate of 0:1, polynomial rate decay with a power of 4, weight decay of 0:0005, and momentum of 0:9 using the neural network framework of Table 1. During training, data augmentation tricks, including random crops, rotations, and hue, saturation, and exposure shifts, may be utilized. For example, after initial training on images at 224×224, the convolutional neural network 110 can be further trained at a larger size (e.g., 448×448) to fine-tune the convolutional neural network 110. For this fine-tuning, the modified convolutional neural network may be trained with the above parameters but for 10 epochs and starting at a learning rate of 0.001. In some implementations, at this higher resolution, the convolutional neural network 110 achieves a top-1 accuracy of 76:5% and a top-5 accuracy of 93:3%.

To achieve high accuracy with low latency, the convolutional neural network 110 may have a simple structure that makes the representation easier to learn during training. For example, the convolutional neural network 110 may utilize batch normalization. Batch normalization leads to significant improvements in convergence while reducing or eliminating the need for other forms of regularization. In some implementations, by adding batch normalization on convolutional layers in the convolutional neural network 110, a more than 2% improvement in mean average precision may be achieved. Batch normalization also helps regularize the model. With batch normalization, dropout can be removed from the model without overfitting.

The convolutional neural network 110 may use an input resolution for images from classifier datasets that is higher than the standard resolution in order to better match image resolutions typically used for object detection. State-of-the-art detection methods may use classifiers pre-trained on a classification dataset (e.g., ImageNet). Most classifiers operate on input images smaller than 256×256 pixels. Some classifier networks may be trained at 224×224, and the resolution may be increased to 448×448 for object detection. This means the network has to simultaneously switch to learning object detection and adjust to the new input resolution. In some implementations, the convolutional neural network 110 is first fine-tuned by training with images from a classification dataset (e.g., ImageNet) but operating at the full resolution used for detection (e.g., 448×448) for 10 epochs. This approach may give the convolutional neural network 110 time to adjust its filters to work better on higher resolution input. The resulting model stored in the convolutional neural network 110 by training may then be fine-tuned with images from detection datasets (e.g., COCO). For example, training the convolutional neural network 110 with images from an object detection dataset that has a classification label but lacks a localization label may include up-sampling the training image to a higher resolution to match a resolution of training images in a corpus of object detection training images that are associated with classification labels and localization labels. In some implementations, using the higher resolution detection resolution when training with classification dataset images may provide an increase of almost 4% mean average precision.

The convolutional neural network 110 may be configured to predict offsets and confidences for bounding boxes using anchor boxes and convolutional layers, rather than using fully connected layers to predict coordinates of bounding boxes. Predicting offsets instead of coordinates simplifies the problem and may make it easier for the convolutional neural network 110 to learn.

Objects, especially large objects, tend to occupy the center of an image, so it is good to have a single location right at the center to predict these objects instead of four locations that are all near the center. In some implementations, the size of the input images is adjusted to provide an odd number of cells in each dimension of an output feature map of the convolutional neural network 110 (e.g., 416×416 input image for 13×13 feature map with a down-sampling factor of 32).

The convolutional neural network 110 may be configured to predict class and objectness (i.e., a confidence level or likelihood that an object actually appears within the corresponding region bounding box) for the anchor boxes. The objectness prediction may predict the intersection over union (IOU) of the ground truth bounding box and the proposed box, and the class predictions may predict the conditional probability of that class given that there is an object present. Using anchor boxes may cause a small decrease in accuracy (e.g., mean average precision) while significantly improving recall (i.e., the percentage of objects present that are detected).

The convolutional neural network 110 may be trained in part using training images with associated localization labels and classification labels and be trained in part using training images with associated classification labels that lack localization labels. This may allow the convolutional neural network 110 to utilize large amounts of training data from a variety of image detection and image classification training datasets, which may have diverse characteristics. In some implementations, the convolutional neural network lacks fully connected layers and has been trained using training images at multiple different resolutions by dynamically resizing the convolutional neural network. For example, the convolutional neural network 110 may be trained using the process 600 of FIG. 6 and/or the process 700 of FIG. 7.

Dimension clusters for ground truth bounding boxes in a detection dataset may be used to determine better priors for the bounding boxes to facilitate training of the convolutional neural network 110 for detection of objects. For example, the convolutional neural network 110 may be trained using priors for a set of bounding boxes that were determined by a clustering analysis of bounding boxes in localization labels from a corpus of training images, and the clustering analysis used a distance metric based on intersection over union. Some object detection systems use anchor boxes with dimensions that are hand-picked. The convolutional neural network 110 can learn to adjust the boxes appropriately, but, by picking better priors for the bounding boxes predicted by the convolutional neural network to start with, it becomes easier for the convolutional neural network to learn to predict good detections. Instead of choosing priors by hand, a clustering analysis (e.g., a k-means clustering analysis) can be run on the training set bounding boxes to automatically find good priors.

The convolutional neural network 110 may be configured to use fine-grained features, but at the same resolution as the output feature map. This may be accomplished by passing through higher resolution features from earlier layers in the convolutional neural network 110 and stacking the features in multiple channels per cell of the output feature map. For example, the convolutional neural network 110 may have an output feature map that is 13×13 cells. While this is sufficient for large objects, the convolutional neural network 110 may benefit from finer grained features for localizing smaller objects. In some implementations, the convolutional neural network 110 is modified to include a pass-through layer that brings features from an earlier layer at a higher resolution (e.g., 26×26 resolution) for consideration in the output layer(s). The pass-through layer concatenates the higher resolution features with the low resolution features by stacking adjacent features into different channels instead of spatial locations. For example, this may turn the 26×26×512 feature map into a 13×13×2048 feature map, which can be concatenated with the original output layer features. A detector runs on top of this expanded feature map so that it has access to fine grained features. In some implementations, this modification provides a modest 1% performance increase (e.g., in mean average precision).

The convolutional neural network 110 may be trained using multi-scale training. In some implementations, the convolutional neural network 110 includes convolutional and pooling layers and lacks fully connected layers, and because of this structure the convolutional neural network 110 can be resized on the fly. The convolutional neural network 110 can be made robust to running on images of different sizes. This capability may be trained into the convolutional neural network 110. Instead of fixing the input image size during training, the input image size for the convolutional neural network 110 is changed every few iterations. Every 10 batches, the convolutional neural network 110 may randomly choose a new input image size. For example, where the convolutional neural network 110 is configured to down-sample by a factor of 32, the input image sizes may be adjusted to take on values that are multiples of this down-sampling factor (e.g., 320×320, 352×352, 608×608). The convolutional neural network 110 may be resized to one of these resolutions before continuing training. This regime may cause the convolutional neural network 110 to learn to predict well across a variety of input image dimensions. This means that the same convolutional neural network 110 can predict detections at different resolutions. The convolutional neural network 110 may run faster at smaller sizes, so multiscale training of the convolutional neural network 110 enables an easy tradeoff between speed and accuracy. At low resolutions, the convolutional neural network 110 may operate as a cheap, fairly accurate detector. For example, at 288×288, the convolutional neural network 110 may perform inference (i.e., object detection and classification for images) at more than 90 FPS with competitive mean average precision. This multiscale training may make the convolutional neural network 110 well suited for smaller GPUs, high framerate video, or multiple video streams.

The predictions 120 are passed to an annotation module 130 that is configured to annotate the image 102 with metadata based on the predictions 120 to obtain an annotated image 132. For example, the metadata may include a list of regions (e.g., specified by bounding boxes) that depict an object and respective classes for those objects. In some implementations, the annotation includes writing the metadata to a header of a file storing the image 102. In some implementations, the annotation includes graphical annotation of the image 102 that alters pixel values to overlay images based on the metadata (e.g., drawing identified bounding boxes for object regions on the image). For example, the process 500 of FIG. 5 may be implemented by the annotation module 130 to obtain the annotated image 132, which may, when displayed, resemble the annotated image 200 of FIG. 2. For example, the annotation module 130 may determine the metadata for annotation by selecting regions of the image 102 that are deemed to depict objects based on the localization data 122 and classifying the objects in the respective regions based on the classification data 124.

Figure 2:
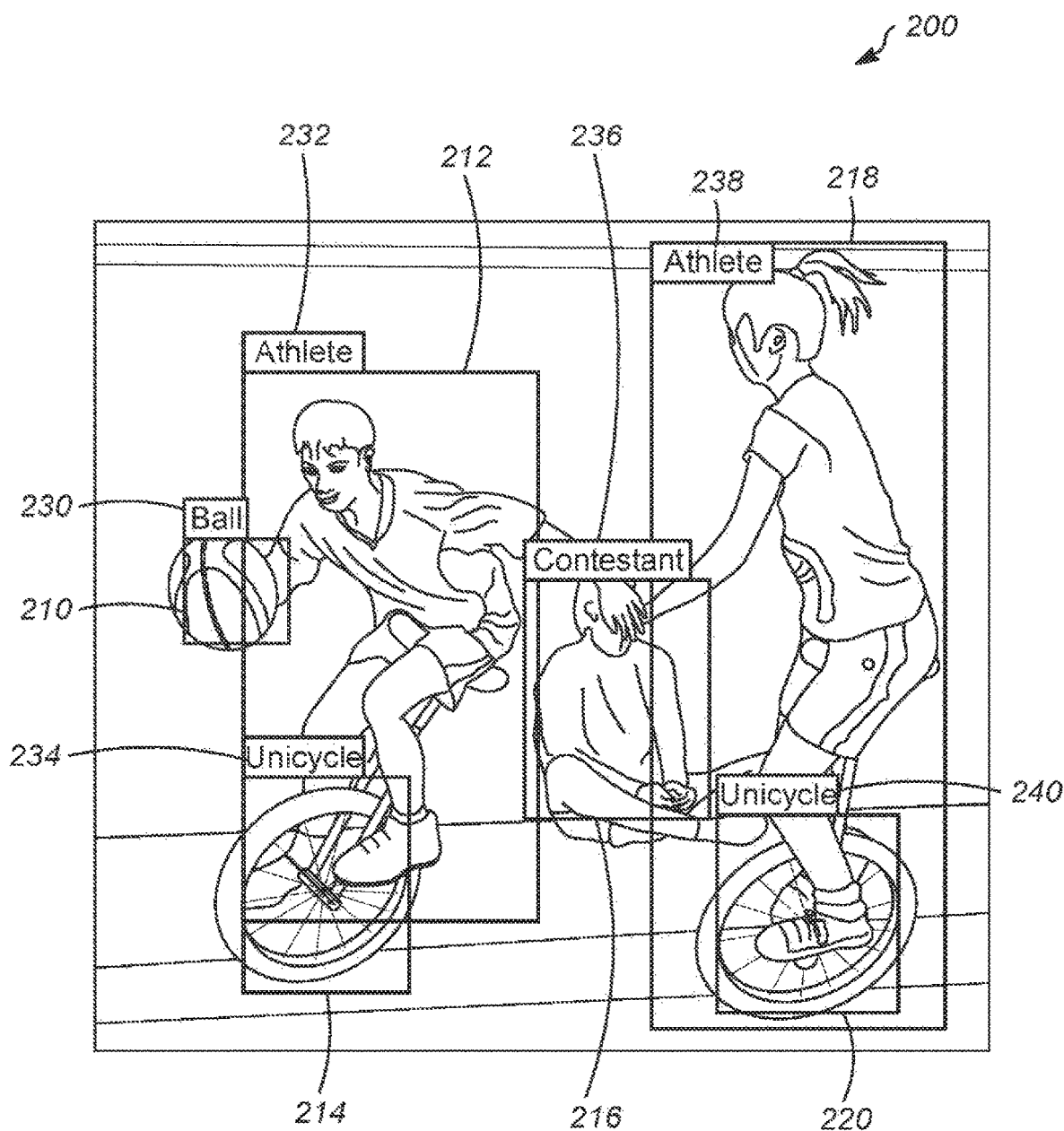
FIG. 2 is a pictorial illustration of an example of an image that has been graphically annotated based on localization data and classification data for objects appearing in the image.

FIG. 2 is a pictorial illustration of an example of an image 200 that has been graphically annotated based on localization data and classification data for objects appearing in the image. The image 200 depicts a number of objects, some of which have been detected and classified (e.g., by implementing the process 400 using the system 100). The image 200 has been graphically annotated to highlight and label the detected objects in the image 200. In this example, six objects have been detected, respective bounding boxes (210, 212, 214, 216, 218, and 220) have been identified (e.g., based on predictions of a convolutional neural network), and borders or frames around these bounding boxes have been overlaid on the image 200. The six objects have each been classified (e.g., based on predictions of a convolutional neural network), and text or tags (230, 232, 234, 236, 238, and 240) corresponding to the respective classes for the objects have been overlaid on the image 200 in or near the corresponding bounding boxes (210, 212, 214, 216, 218, and 220). For example, the graphical annotation of the image 200 may be displayed to a human to aide in object recognition and efficiently provide metadata about the environment to the human in a manner that is easy for the human to understand.

FIG. 3A is a block diagram of an example of a system 300 configured for image-based object detection and classification. The system 300 includes an image capture device 310 (e.g., a camera or a drone) that includes a processing apparatus 312 that is configured to receive images from one or more image sensors 314. The image capture device 310 includes a fastening article 316 attached to the one or more image sensors 314 and configured to hold the one or more image sensors 314 in place on a portion (e.g., a head, a chest, or an arm) of a human body. The processing apparatus 312 may include a convolutional neural network (e.g., implemented as a software module or a specialized hardware module) configured to detect and classify objects appearing in images from the one or more image sensors 314. The processing apparatus 312 may be configured to apply the convolutional neural network to an image from the one or more image sensors 314 to obtain localization data and classification data, and annotate the image based on the localization data and the classification data. The image capture device 310 includes one or more motion sensors 318 configured to detect motion of the one or more image sensors 314. The image capture device 310 includes a user interface 320, which may allow a user to control image capture functions and/or view images. The image capture device 310 includes a communications interface 322 for transferring images to other devices. The image capture device 310 includes a battery 324 for powering the image capture device 310. For example, the system 300 may be used to implement processes described in this disclosure, such as the process 400 of FIG. 4, the process 500 of FIG. 5, the process 600 of FIG. 6, and the process 700 of FIG. 7.

The processing apparatus 312 may include one or more processors having single or multiple processing cores. The processing apparatus 312 may include memory, such as a random-access memory (RAM) device, flash memory, or any other suitable type of storage device, such as a non-transitory computer readable memory. The memory of the processing apparatus 312 may include executable instructions and data that can be accessed by one or more processors of the processing apparatus 312. For example, the processing apparatus 312 may include one or more DRAM modules, such as double data rate synchronous dynamic random-access memory (DDR SDRAM). In some implementations, the processing apparatus 312 may include a graphical processing unit (GPU). In some implementations, the processing apparatus 312 may include a digital signal processor (DSP). In some implementations, the processing apparatus 312 may include an application specific integrated circuit (ASIC). For example, the processing apparatus 312 may include a custom image signal processor. In some implementations, the processing apparatus 312 may have multiple processing units in different portions of the image capture device 310.

The processing apparatus 312 may include a convolutional neural network configured to detect and classify objects appearing in images from the one or more image sensors 314. For example, the convolutional neural network may be implemented by software executed by the processing apparatus 312. The processing apparatus 312 may be configured to access an image from one or more image sensors 314; apply a convolutional neural network (e.g., the convolutional neural network 110) to the image to obtain localization data to detect an object depicted in the image and to obtain classification data to classify the object; and annotate the image based on the localization data and the classification data. In some implementations, the convolutional neural network outputs classification data including predictions that correspond to respective classes that are nodes in a hierarchical tree of classes. For example, the processing apparatus 312 may be configured to select a class based on the classification data and the hierarchical tree by starting at a root of the hierarchical tree and iteratively selecting a descendant class with the highest corresponding prediction of the classification data from among sibling classes until a leaf class is selected or the prediction values of all descendants of the selected class are below a threshold. The convolutional neural network may have been trained in part using training images with associated localization labels and classification labels and may have been trained in part using training images with associated classification labels that lack localization labels. For example, the training images may have been gathered from multiple training image datasets, including a classification dataset (e.g., COCO) and a detection dataset (e.g., ImageNet). For example, the convolutional neural network may be trained by implementing the process 600 of FIG. 6 and/or the process 700 of FIG. 7.

The one or more image sensors 314 are configured to capture images. The one or more image sensors 314 are configured to detect light of a certain spectrum (e.g., the visible spectrum or the infrared spectrum) and convey information constituting an image as electrical signals (e.g., analog or digital signals). For example, the one or more image sensors 314 may include charge-coupled devices (CCD) or active pixel sensors in complementary metal-oxide-semiconductors (CMOS). The one or more image sensors 314 may detect light incident through respective lens (e.g., a fisheye lens). In some implementations, the one or more image sensors 314 include digital-to-analog converters. In some implementations, the one or more image sensors 314 have respective fields of view that overlap. The one or more image sensors 314 are attached to the processing apparatus 312 as components of the image capture device 310.

The fastening article 316 is attached to the one or more image sensors 314 and configured to hold the one or more image sensors 314 in place on a portion of a human body. For example, the fastening article 316 may include glasses or goggles that, when worn by a human, fasten the one or more image sensors 314 in place on a head of the human. For example, the fastening article 316 may include a wristband that, when worn by a human, fastens the one or more image sensors 314 in place on an arm of the human. For example, the fastening article 316 may include a shirt or vest that, when worn by a human, fastens the one or more image sensors 314 in place on a chest of the human. For example, the fastening article 316 may include a band or strap of a headset configured for augmented reality applications and/or virtual reality applications that, when worn by a human, fastens the one or more image sensors 314 in place on a head of the human.

The one or more motion sensors 318 are configured to detect motion of the one or more image sensors 314. For example, the one or more motion sensors 318 may include parts of an inertial measurement unit (e.g., including gyroscopes, accelerometers, and/or magnetometers) that is mounted in a housing with the one or more image sensors 314. The processing apparatus 312 may be configured to determine a sequence of orientation estimates based on sensor data from the one or more motion sensors 318. For example, determining the sequence of orientation estimates may include applying quadratic estimation to sensor data from a plurality of the one or more motion sensors 318.

The image capture device 310 may include a user interface 320. For example, the user interface 320 may include an LCD display for presenting images and/or messages to a user. For example, the user interface 320 may include goggles or a headset with a display configured to support augmented reality applications, and the user interface 320 may be configured to incorporate metadata based on localization data and/or classification data from the convolutional neural network into images displayed through the user interface 320. For example, the user interface 320 may include a button or switch enabling a person to manually turn the image capture device 310 on and off. For example, the user interface 320 may include a shutter button for snapping pictures.

The image capture device 310 may include a communications interface 322, which may enable communications with a personal computing device (e.g., a smartphone, a tablet, a laptop computer, or a desktop computer). For example, the communications interface 322 may be used to receive commands controlling image capture and processing in the image capture device 310. For example, the communications interface 322 may be used to transfer image data to a personal computing device. For example, the communications interface 322 may include a wired interface, such as a high-definition multimedia interface (HDMI), a universal serial bus (USB) interface, or a FireWire interface. For example, the communications interface 322 may include a wireless interface, such as a Bluetooth interface, a ZigBee interface, and/or a Wi-Fi interface.

The image capture device 310 may include a battery 324 that powers the image capture device 310 and/or its peripherals. For example, the battery 324 may be charged wirelessly or through a micro-USB interface.

FIG. 3B is a block diagram of an example of a system 330 configured for image-based object detection and classification. The system 330 includes an image capture device 340 and a personal computing device 360 that communicate via a communications link 350. The image capture device 340 includes one or more image sensors 342 that are configured to capture images. The image capture device 340 includes a communications interface 348 configured to transfer images via the communication link 350 to the personal computing device 360. The personal computing device 360 includes a processing apparatus 362 that is configured to receive, using the communications interface 366, images from the one or more image sensors 342. The image capture device 340 includes a fastening article 344 attached to the one or more image sensors 342 and configured to hold the one or more image sensors 342 in place on a portion (e.g., a head, a chest, or an arm) of a human body. The processing apparatus 362 may include a convolutional neural network (e.g., implemented as a software module or a specialized hardware module) configured to detect and classify objects appearing in images from the one or more image sensors 342. The processing apparatus 362 may be configured to apply the convolutional neural network to an image from the one or more image sensors 342 to obtain localization data and classification data, and annotate the image based on the localization data and the classification data. The image capture device 340 includes one or more motion sensors 346 configured to detect motion of the one or more image sensors 342. For example, the system 330 may be used to implement processes described in this disclosure, such as the process 400 of FIG. 4, the process 500 of FIG. 5, the process 600 of FIG. 6, and the process 700 of FIG. 7.

The one or more image sensors 342 are configured to capture images. The one or more image sensors 342 are configured to detect light of a certain spectrum (e.g., the visible spectrum or the infrared spectrum) and convey information constituting an image as electrical signals (e.g., analog or digital signals). For example, the one or more image sensors 342 may include charge-coupled devices (CCD) or active pixel sensors in complementary metal-oxide-semiconductors (CMOS). The one or more image sensors 342 may detect light incident through respective lenses (e.g., a fisheye lens). In some implementations, the one or more image sensors 342 include digital-to-analog converters. In some implementations, the one or more image sensors 342 have respective fields of view that overlap.

The fastening article 344 is attached to the one or more image sensors 342 and configured to hold the one or more image sensors 342 in place on a portion of a human body. For example, the fastening article 344 may include glasses or goggles that, when worn by a human, fasten the one or more image sensors 342 in place on a head of the human. For example, the fastening article 344 may include a wristband that, when worn by a human, fastens the one or more image sensors 342 in place on an arm of the human. For example, the fastening article 344 may include a shirt or vest that, when worn by a human, fastens the one or more image sensors 342 in place on a chest of the human. For example, the fastening article 344 may include a band or strap of a headset configured for augmented reality applications and/or virtual reality applications that, when worn by a human, fastens the one or more image sensors 342 in place on a head of the human.

The one or more motion sensors 346 are configured to detect motion of the one or more image sensors 342. For example, the one or more motion sensors 346 may include parts of an inertial measurement unit (e.g., including gyroscopes, accelerometers, and/or magnetometers) that is mounted in a housing with the one or more image sensors 342. The processing apparatus 362 may be configured to determine a sequence of orientation estimates based on sensor data from the one or more motion sensors 346. For example, determining the sequence of orientation estimates may include applying quadratic estimation to sensor data from a plurality of the one or more motion sensors 346.

The communications link 350 may be a wired communications link or a wireless communications link. The communications interface 348 and the communications interface 366 may enable communications over the communications link 350. For example, the communications interface 348 and the communications interface 366 may include a high-definition multimedia interface (HDMI), a universal serial bus (USB) interface, a FireWire interface, a Bluetooth interface, a ZigBee interface, and/or a Wi-Fi interface. For example, the communications interface 348 and the communications interface 366 may be used to transfer image data from the image capture device 340 to the personal computing device 360 for image signal processing (e.g., object detection, object classification, filtering, tone mapping, stitching, encoding) to generate output images and/or metadata based on image data from the one or more image sensors 342. For example, the communications interface 348 and the communications interface 366 may be used to transfer motion sensor data from the image capture device 340 to the personal computing device 360. For example, the communications interface 348 and the communications interface 366 may be used to transfer control signals to the image capture device 340 from the personal computing device 360 for controlling capture of images.

The processing apparatus 362 may include one or more processors having single or multiple processing cores. The processing apparatus 362 may include memory, such as a random-access memory (RAM) device, flash memory, or any other suitable type of storage device, such as a non-transitory computer readable memory. The memory of the processing apparatus 362 may include executable instructions and data that can be accessed by one or more processors of the processing apparatus 362. For example, the processing apparatus 362 may include one or more DRAM modules, such as double data rate synchronous dynamic random-access memory (DDR SDRAM). In some implementations, the processing apparatus 312 may include a graphical processing unit (GPU). In some implementations, the processing apparatus 362 may include a digital signal processor (DSP). In some implementations, the processing apparatus 362 may include an application specific integrated circuit (ASIC). For example, the processing apparatus 362 may include a custom image signal processor.

The processing apparatus 362 may include a convolutional neural network configured to detect and classify objects appearing in images from the one or more image sensors 342. For example, the convolutional neural network may be implemented by software executed by the processing apparatus 362. The processing apparatus 362 may be configured to access an image from one or more image sensors 342; apply a convolutional neural network (e.g., the convolutional neural network 110) to the image to obtain localization data to detect an object depicted in the image and to obtain classification data to classify the object; and annotate the image based on the localisation data and the classification data. In some implementations, the convolutional neural network outputs classification data including predictions that correspond to respective classes that are nodes in a hierarchical tree of classes. For example, the processing apparatus 362 may be configured to select a class based on the classification data and the hierarchical tree by starting at a root of the hierarchical tree and iteratively selecting a descendant class with the highest corresponding prediction of the classification data from among sibling classes until a leaf class is selected or the prediction values of all descendants of the selected class are below a threshold. The convolutional neural network may have been trained in part using training images with associated localization labels and classification labels and may have been trained in part using training images with associated classification labels that lack localization labels. For example, the training images may have been gathered from multiple training image datasets, including a classification dataset (e.g., COCO) and a detection dataset (e.g., ImageNet). For example, the convolutional neural network may be trained by implementing the process 600 of FIG. 6 and/or the process 700 of FIG. 7.

The personal computing device 360 may include a user interface 364. For example, the user interface 364 may include a touchscreen display for presenting images and/or messages to a user and receiving commands from a user. For example, the user interface 364 may include goggles or a headset with a display configured to support augmented reality applications, and the user interface 364 may be configured to incorporate metadata based on localization data and/or classification data from the convolutional neural network into images displayed through the user interface 364. For example, the user interface 364 may include a button or switch enabling a person to manually turn the personal computing device 360 on and off. In some implementations, commands (e.g., start recording video, stop recording video, snap photograph, or select tracking target) received via the user interface 364 may be passed on to the image capture device 340 via the communications link 350.

Figure 4:
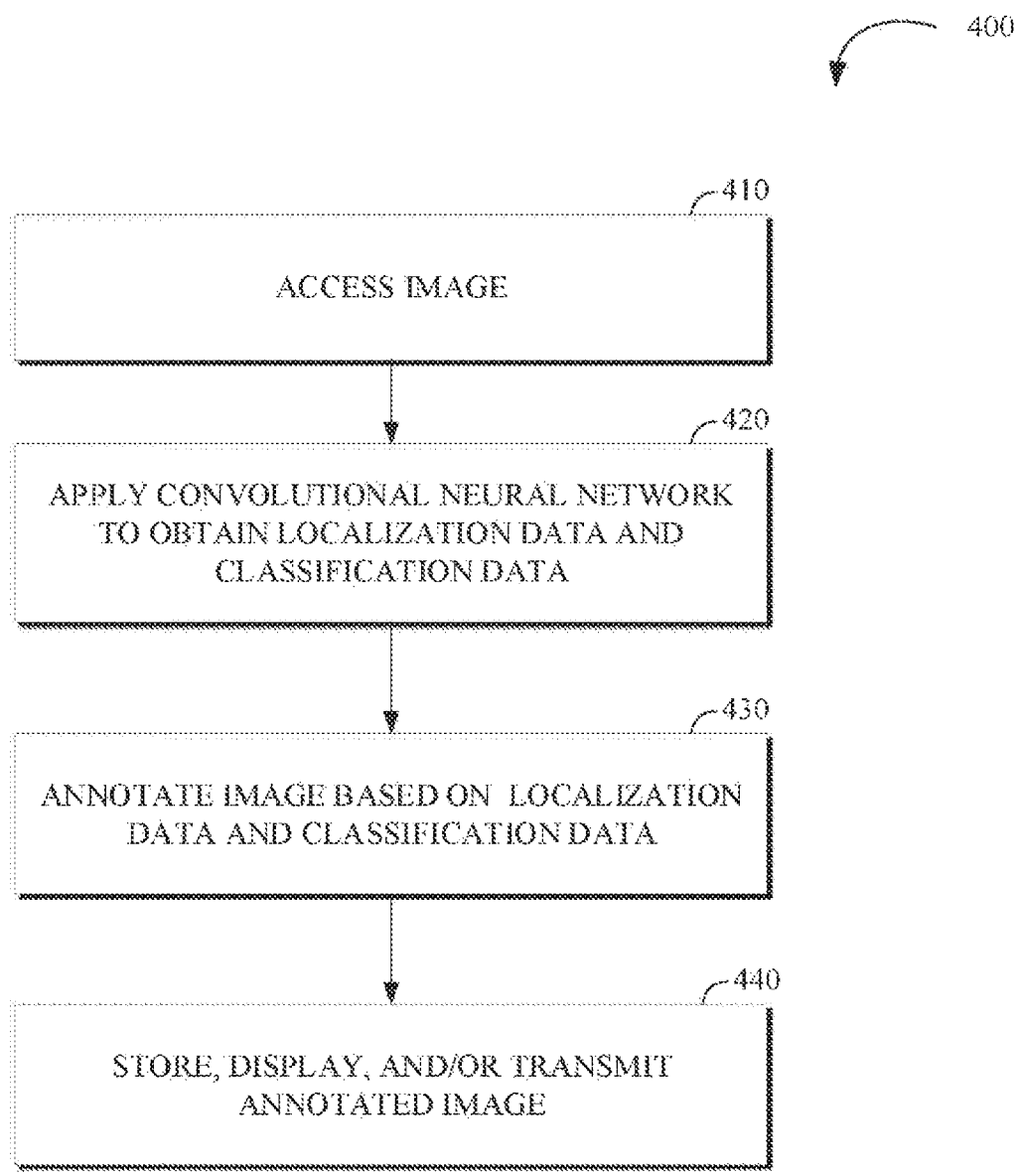
FIG. 4 is a flowchart of an example of a process for detecting and classifying objects appearing in an image.

FIG. 4 is a flowchart of an example of a process 400 for detecting and classifying objects appearing in an image. The process 400 includes accessing 410 an image from an image sensor; applying 420 a convolutional neural network to the image to obtain localization data to detect an object depicted in the image and to obtain classification data to classify the object; annotating 430 the image based on the localization data and the classification data to obtain an annotated image; and storing, displaying, or transmitting 440 the annotated image. For example, the process 400 may be implemented by the system 100 of FIG. 1, the system 300 of FIG. 3A, or the system 330 of FIG. 3B. For example, the process 400 may be implemented by an image capture device, such as the image capture device 310 shown in FIG. 3A. For example, the process 400 may be implemented by a personal computing device, such as the personal computing device 360.

The process 400 includes accessing 410 an image from an image sensor. The image sensor may be part of an image capture system (e.g., the image capture device 310, or the image capture device 340). In some implementations, the image sensor may be attached to a processing apparatus that implements the process 400. For example, the image may be accessed 410 by receiving the image from the image sensor via a bus. In some implementations, the image may be accessed 410 via a communications link (e.g., the communications link 350). For example, the image may be accessed 410 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the image may be accessed 410 via the communications interface 366. For example, the image may be accessed 410 as an input image signal, which may represent each pixel value in a defined format, such as in a RAW image format. In some implementations, the image may be a frame of a video (i.e., one of a sequence of images of a video). In some implementations, the image is accessed 410 directly from the image sensor without intermediate image processing. In some implementations, the image is accessed 410 after being subjected to intermediate image processing (e.g., spatial noise reduction and/or temporal noise reduction). In some implementations, the image is accessed 410 by retrieving the image from a memory or other data storage apparatus.

The process 400 includes applying 420 a convolutional neural network to the image to obtain localization data to detect an object depicted in the image and to obtain classification data to classify the object. The convolutional neural network may have been trained in part using training images with associated localization labels and classification labels and may have been trained in part using training images with associated classification labels that lack localization labels. The convolutional neural network may be jointly trained on classification and detection data. Images labelled for detection may be utilized to learn detection-specific information, such as bounding box coordinate prediction and object likelihood as well as how to classify common objects. Training images associated only with classification labels may be utilized to expand the number of categories of objects the convolutional neural network can detect. A collection of images from both detection and classification datasets may be used during training. When the neural network encounters an image labelled for detection, error can be backpropagated based on a full loss function for the neural network. When the neural network encounters a classification image, backpropagation of loss may be limited to loss from the classification-specific parts of the architecture. For example, the process 700 of FIG. 7 may be implemented to train the convolutional neural network with training images from a classification dataset that are associated with classification labels but lack localization labels. For example, the process 600 of FIG. 6 may be implemented to train the convolutional neural network.

The convolutional neural network (e.g., the convolutional neural network 110) may be configured for direct location prediction. For example, the localization data may include one or more bounding boxes that are constrained to be centered within a region of the image corresponding to a cell of a feature map for the image, and coordinates of the one or more bounding boxes within the region are predictions of the convolutional neural network included in the localization data.

When using anchor boxes in a convolutional neural network model, instability can be encountered, especially during early iterations. Most of the instability comes from predicting the (x, y) locations for a bounding box. In region proposal networks, the network predicts values $t\_x$ and $t\_y$ and the (x, y) center coordinates are calculated as:

$$x=(t\_x * w\_a) - x\_a$$

$$y=(t\_y * h\_a) - y\_a \qquad \text{Equation (1)}$$

where $(x\_a, y\_a)$ are the coordinates of the anchor box within the image, $w\_a$ is the width of the anchor box, and $h\_a$ is the height of the anchor box. For example, a prediction of $t\_x=1$ would shift the box to the right by the width of the anchor box, and a prediction of $t\_x=-1$ would shift it to the left by the same amount. This formulation of Equation (1) is unconstrained, so any anchor box can end up at any point in the image, regardless of which location predicted the box. With random initialization, the model may take a long time to stabilize to predicting sensible offsets.

Figure 8:
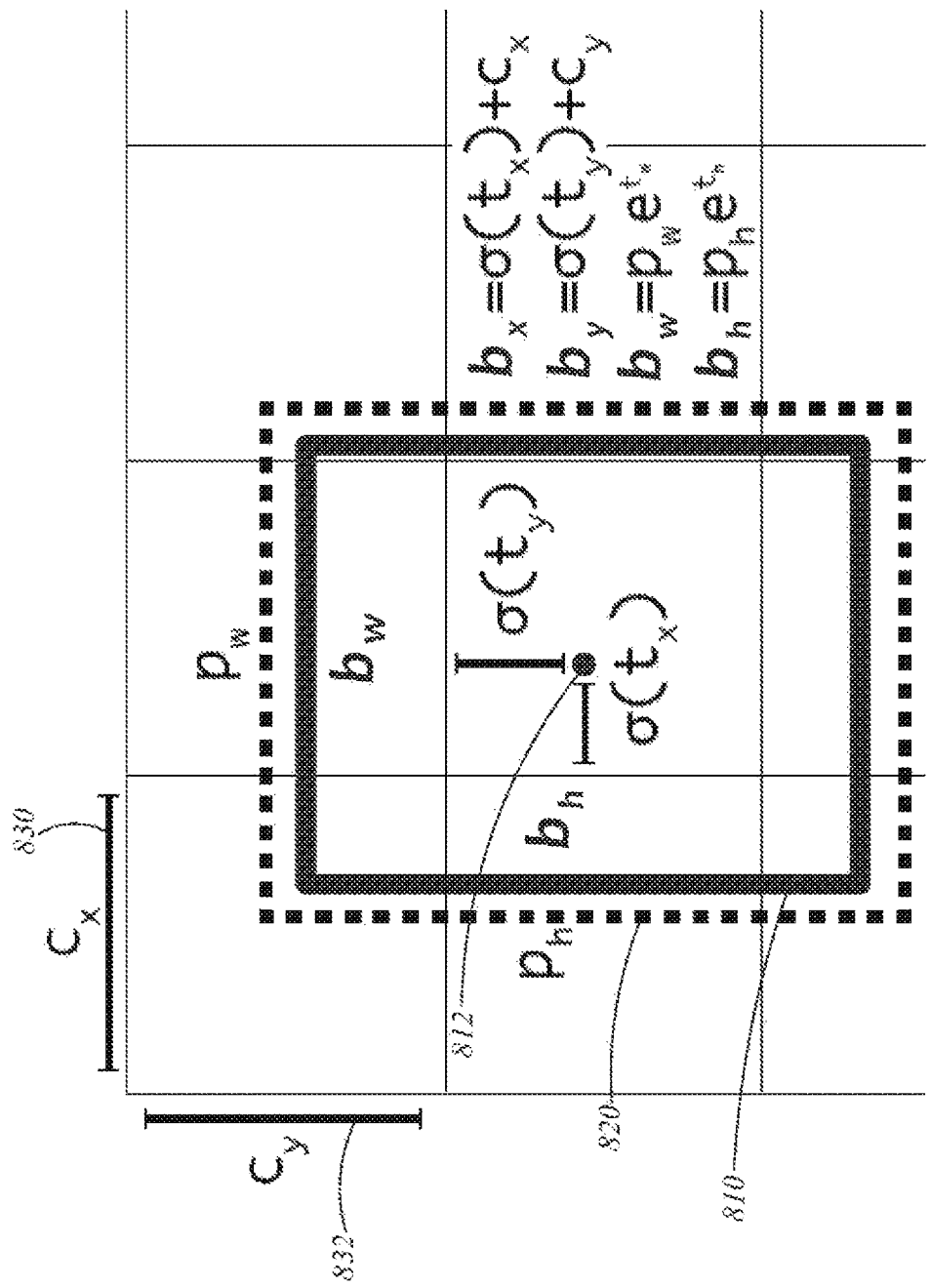
FIG. 8 is a diagram of an example of a bounding box with dimension priors and location prediction constrained within a cell corresponding to a feature in a feature map for an image.

In some implementations, instead of predicting offsets, the convolutional neural network (e.g., the convolutional neural network 110) may be configured to predict location coordinates relative to the location of a grid cell in a feature map. This bounds the ground truth to fall between 0 and 1. A logistic activation is used to constrain the convolutional neural network's predictions for the offsets to fall in this range. For example, the convolutional neural network may predict 5 bounding boxes at each cell in an output feature map. The network predicts five coordinates for each bounding box: $t\_x$, $t\_y$, $t\_w$, $t\_h$, and $t\_o$. Where a cell is offset from the top left corner of the image by $(c\_x, c\_y)$ and the bounding box prior has width and height $p\_w, p\_h$, then the predictions correspond to:

$$b\_x = \sigma(t\_x) + c\_x$$

$$b\_y = \sigma(t\_y) + c\_y$$

$$b\_w = p\_w * e^{(t\_w)}$$

$$b\_h = p\_h * e^{(t\_h)}$$

$$Pr(\text{object}) * IOU(b; \text{object}) = \sigma(t\_o) \qquad \text{Equation (2)}$$

where $\sigma( )$ is the sigmoid function, $(b\_x, b\_y)$ are the coordinates of the bounding box (e.g., the center of the bounding box) in units of fractions of feature map cell width, height; $b\_w$ is the width of the bounding box; $b\_h$ is the height of the bounding box; $Pr(\text{object})$ is the probability that an object appears within the bounding box; and $IOU(b, \text{object})$ is an intersection over union metric for the bounding box and the object's ground truth region (e.g., a box) from a localization label for the object. Because the location prediction is constrained, the parametrization is easier to learn, making the convolutional neural network more stable. Using dimension clusters along with directly predicting the bounding box center location may improve performance of the convolutional neural network by almost 5% over a version with anchor boxes. For example, FIG. 8 depicts an example of a bounding box that results from direct location prediction by the convolutional neural network using Equation (2).

Training the convolutional neural network (e.g., convolutional neural network 110) with images from multiple datasets, including a detection dataset (e.g., COCO) and a classification dataset (e.g., ImageNet) presents some challenges. Detection datasets typically have only common objects and general labels, like "dog" or "boat". Classification datasets may have a much wider and deeper range of labels. ImageNet has more than a hundred breeds of dog, including "Norfolk terrier", "Yorkshire terrier", and "Bedlington terrier". In order to train on both datasets, a coherent way to merge these sets of labels/classes is needed. Most approaches to classification use a softmax layer across all the possible categories to compute the final probability distribution. Using a softmax assumes the classes are mutually exclusive. This can present problems for combining datasets. For example, combining ImageNet and COCO using this model would cause problems because the classes "Norfolk terrier" and "dog" are not mutually exclusive. Instead, a multi-label model, which does not assume mutual exclusion, may be used to combine the datasets. This approach may ignore some known structure of the data in a dataset, such as that all of the COCO classes are mutually exclusive.

Figure 9:
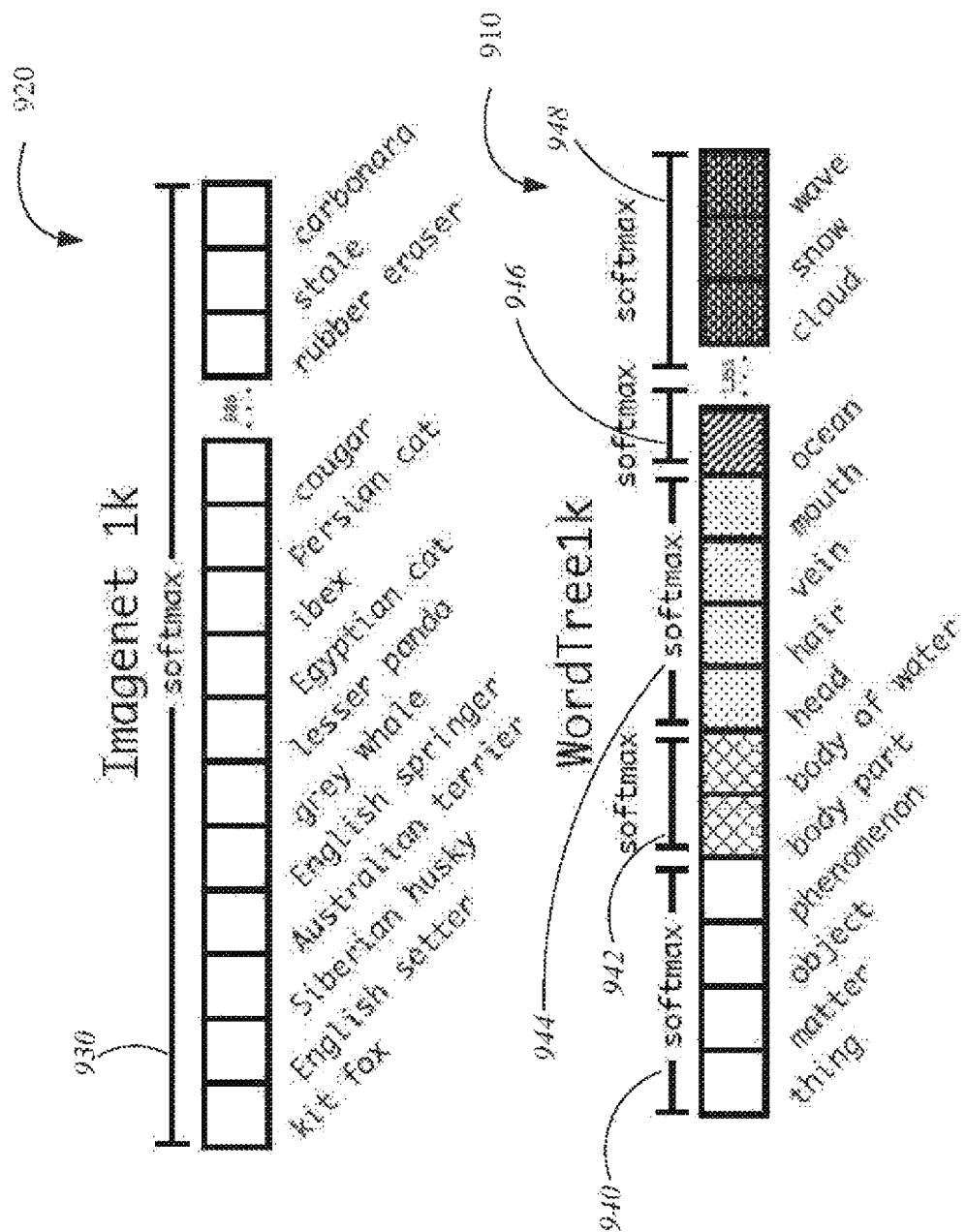
FIG. 9 is a diagram of examples of prediction formats, comparing a hierarchical classification scheme to a flat classification scheme.

The convolutional neural network (e.g., convolutional neural network 110) may be configured to output classification data that predicts classes in a hierarchical tree of classes. For example, applying 420 the convolutional neural network to the image may cause the convolutional neural network to output classification data including predictions that correspond to respective classes that are nodes in a hierarchical tree of classes. The hierarchical tree of classes may be constructed using a language database, such as WordNet. For example, the hierarchical tree of classes may be constructed as described in relation to FIGS. 9, 10A, and 10B. In some implementations, the predictions corresponding to classes that are siblings in the hierarchical tree are related by a softmax function (e.g., as shown in FIG. 9).

The process 400 includes annotating 430 the image based on the localization data and the classification data to obtain an annotated image. Annotating 430 the image may include determining metadata for the image based on the localization data and the classification data and then associating or incorporating the metadata with the image. For example, the metadata may include a list of regions (e.g., specified by bounding boxes) that depict an object and respective classes for those objects. In some implementations, the annotating 430 the image includes writing the metadata to a header of a file storing the image. In some implementations, annotating 430 the image includes graphical annotation of the image that alters pixel values to overlay images based on the metadata (e.g., drawing identified bounding boxes for object regions on the image). For example, the process 500 of FIG. 5 may be implemented to annotate 430 the image. For example, the annotated image may, when displayed, resemble the annotated image 200 of FIG. 2. For example, the metadata used for annotating 430 the image may be determined by selecting regions of the image that are deemed to depict objects based on the localization data (e.g., object likelihoods for predicted bounding boxes) and classifying the objects in the respective regions based on the classification data 124. In some implementations, a hierarchical tree of object classes is used for classification of detected objects. For example, a class may be selected based on the classification data and the hierarchical tree by starting at a root of the hierarchical tree and iteratively selecting a descendant class with the highest corresponding prediction of the classification data from among sibling classes until a leaf class is selected or the prediction values of all descendants of the selected class are below a threshold. The image may be annotated 430 based on the selected class. For example, an indication of this selected class is metadata that may be associated with the image (e.g., as part of a header for the image file or as overlaid text incorporated into the image as it will be displayed.

The process 400 includes storing, displaying, or transmitting 440 the annotated image. For example, the annotated image may be transmitted 440 to an external device (e.g., a personal computing device) for display or storage. For example, the annotated image may be stored 440 in memory of a processing apparatus (e.g., the processing apparatus 312 or the processing apparatus 362). For example, the annotated image may be displayed 440 in the user interface 320 or in the user interface 364. For example, the annotated image may be transmitted 440 via the communications interface 322.

Figure 5:
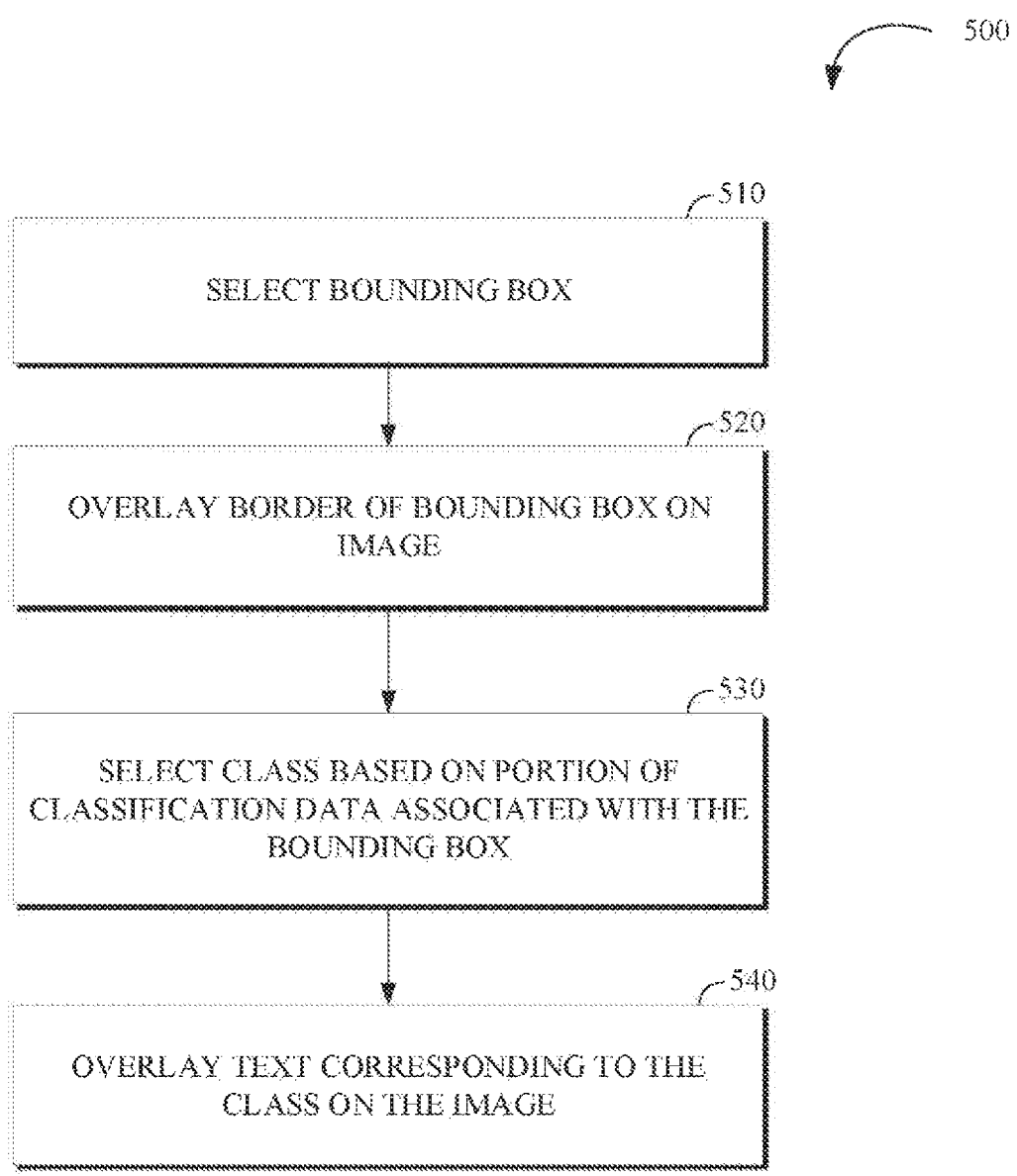
FIG. 5 is a flowchart of an example of a process for graphically annotating an image based on localization data and classification data for objects appearing in the image.

FIG. 5 is a flowchart of an example of a process 500 for graphically annotating an image based on localization data and classification data for objects appearing in the image. The process 500 includes selecting 510 a bounding box from the localization data; overlaying 520 a border of the bounding box on the image; selecting 530 a class based on a portion of the classification data associated with the bounding box; and overlaying 540 text corresponding to the class on the image. For example, the process 500 may be implemented by the system 100 of FIG. 1, the system 300 of FIG. 3A, or the system 330 of FIG. 3B. For example, the process 500 may be implemented by an image capture device, such as the image capture device 310 shown in FIG. 3A. For example, the process 500 may be implemented by a personal computing device, such as the personal computing device 360.

The process 500 includes selecting 510 a bounding box from the localization data. For example, a bounding box specified in the localization data output from a convolutional neural network may be selected 510 by comparing its objectness prediction (e.g., t_o or σ(t_o) of Equation (2)) to a threshold and determining that the objectness for the bounding box exceeds the threshold. In some implementations, the number of bounding boxes selected 510 for a given image may be limited to a maximum number of objects for annotation. For example, a bounding box may be selected 510 based on a comparison of the corresponding objectness predictions for respective bounding boxes of the localization data and selecting 510 a subset of the bounding boxes with the highest objectness predictions. For example, a graphically annotated image that is generated using the process 500 may look like the graphically annotated image 200 of FIG. 2 when the graphically annotated image is displayed.

The process 500 includes overlaying 520 a border of the bounding box on the image. The position and size of the bounding box may be determined from the coordinate predictions for the bounding box using Equation (2). The border of the bounding box may then be generated and overlaid 520 on the image from which the localization data was derived. In some implementations, the border is overlaid 520 by overwriting pixel values for pixels on the border. In some implementations, a supplemental image is stored as metadata (e.g., in a header to the image file), and the pixel values on the border are overwritten in display memory when the annotated image is displayed.

The process 500 includes selecting 530 a class based on a portion of the classification data associated with the bounding box. For example, a class with the highest prediction value from among a set of class predictions associated with the selected 510 bounding box may be selected 530. In some implementations, where the classes predicted correspond to nodes in a hierarchical tree of classes, a class may be selected 530 based on the classification data and the hierarchical tree by starting at a root of the hierarchical tree and iteratively selecting a descendant class with the highest corresponding prediction of the classification data from among sibling classes until a leaf class is selected or the prediction values of all descendants of the selected class are below a threshold.

The process 500 includes overlaying 540 text corresponding to the class on the image. For example, the text overlaid 540 may include the name of the class. In some implementations, the border of the bounding box and/or the text corresponding to the class may be color coded based on the class or the rank of the class in a hierarchical tree of classes.

Figure 6:
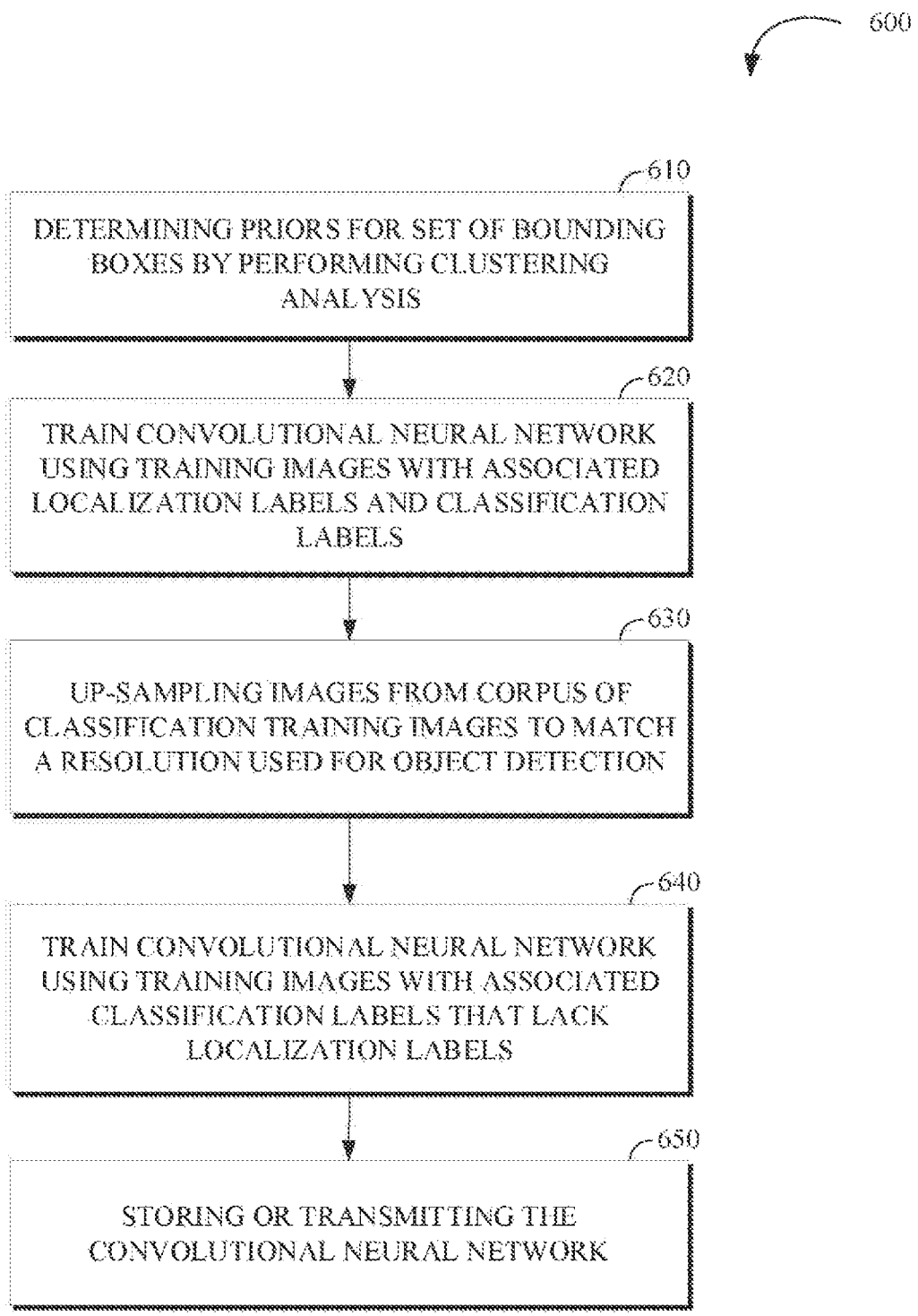
FIG. 6 is a flowchart of an example of a process for training a convolutional neural network for detection and classification of objects appearing in images.

FIG. 6 is a flowchart of an example of a process 600 for training a convolutional neural network for detection and classification of objects appearing in images. The process 600 includes determining 610 priors for a set of bounding boxes by performing a clustering analysis; training 620 the convolutional neural network using training images with associated localization labels and classification labels; up-sampling 630 the training image to a higher resolution to match a resolution of training images in a corpus of object detection training images that are associated with classification labels and localization labels; training 640 the convolutional neural network using training images with associated classification labels that lack localization labels; and storing or transmitting 650 the convolutional neural network. For example, the process 600 may be implemented by the system 100 of FIG. 1, the system 300 of FIG. 3A, or the system 330 of FIG. 3B. For example, the process 600 may be implemented by an image capture device, such as the image capture device 310 shown in FIG. 3A. For example, the process 600 may be implemented by a personal computing device, such as the personal computing device 360. In some implementations, the convolutional neural network state or model that results from the process 600 is utilized for inference (e.g., for object detection and classification) by a different computing device than the computing device used to implement the process 600.

The process 600 includes determining 610 priors for a set of bounding boxes by performing a clustering analysis of bounding boxes in localization labels from a corpus of training images. The clustering analysis may use a distance metric based on intersection over union. Instead of choosing priors by hand, a clustering analysis (e.g., a k-means clustering analysis) can be run on the training set bounding boxes to automatically find good priors for the bounding boxes of the convolutional neural network. If standard k-means with Euclidean distance is used, then larger boxes generate more error than smaller boxes. However, having priors for the bounding boxes that lead to good intersection over union (IOU) scores, which is independent of the size of the box, may be advantageous. For example, the distance metric used in the clustering analysis may be:

$$d(\text{box; centroid}) = 1 - \text{IOU}(\text{box; centroid}) \qquad \text{Equation (3)}$$

where a box and a centroid are specified by their width and height ($w\_b$, $h\_b$) and ($w\_c$, $h\_c$). Using the k-means clustering algorithm with various k values, it has been determined empirically that k=5 offers a good tradeoff between model complexity and high recall. The cluster centroids may be significantly different from hand-picked anchor boxes. There may be fewer short, wide boxes and more tall, thin boxes. In some implementations, using a clustering analysis (e.g., a k-means clustering analysis) to determine 610 bounding box priors starts the model off with a better representation and makes the object detection task easier to learn.

The process 600 includes training 620 the convolutional neural network (e.g., the convolutional neural network 110) using training images with associated localization labels and classification labels. The convolutional neural network outputs localization data and classification data based on an image that is input to the convolutional neural network. The localization labels indicate ground truth values for positions and/or sizes of regions (e.g., bounding boxes) within a training image in which respective objects appear. For example, a localization label for a training image may specify a location (e.g., an x and y coordinate of the center) and a size (e.g., a width and height) of a bounding box for an object appearing in the training image. The localization labels indicate ground truth classes for objects appearing in a training image. In some implementations, the convolutional neural network outputs classification data including predictions that correspond to respective classes that are nodes in a hierarchical tree of classes (as described in relation to FIGS. 9, 10A, and 10B). For example, training 620 the convolutional neural network may include selecting a class in the hierarchical tree of classes that matches a classification label of the training image; and backpropagating classification loss from output nodes of the convolutional neural network corresponding to the selected class and its ancestors in the hierarchical tree. For example, training 620 the convolutional neural network may include selecting a class in the hierarchical tree of classes that matches a classification label of the training image; and backpropagating classification loss from output nodes of the convolutional neural network, excepting nodes corresponding to descendants of the selected class in the hierarchical tree. In some implementations, the convolutional neural network lacks fully connected layers. For example, training 620 the convolutional neural network may include training the convolutional neural network using training images at multiple different resolutions by dynamically resizing the convolutional neural network.

The process 600 includes up-sampling 630 the training image to a higher resolution to match a resolution of training images in a corpus of object detection training images that are associated with classification labels and localization labels. For example, the training image may be from a classification dataset (e.g., the ImageNet dataset) and may be available at a size or resolution (e.g., 224×224 pixels) for that classification dataset. The convolutional neural network may be configured to be applied to images of a size or resolution (e.g., 448×448 pixels) used by an object detection dataset (e.g., the COCO dataset) that is better suited to the object detection task. The training image may be up-sampled (e.g., from 224×224 to 448×448) to a higher resolution to match the resolution used by the convolutional neural network for processing images from the object detection dataset.

The process 600 includes training 640 the convolutional neural network (e.g., the convolutional neural network 110) using training images with associated classification labels that lack localization labels. For example, the training images with associated classification labels that lack localization labels may be from a classification dataset (e.g., the ImageNet dataset). For example, training 640 the convolutional neural network may include selecting a bounding box from the localization data for the training image and backpropagating classification loss from output nodes of the convolutional neural network associated with classification data for the selected bounding box. For example, the process 700 of FIG. 7 may be implemented to train 640 the convolutional neural network. In some implementations, the convolutional neural network outputs classification data including predictions that correspond to respective classes that are nodes in a hierarchical tree of classes (as described in relation to FIGS. 9, 10A, and 10B). For example, training 640 the convolutional neural network may include selecting a class in the hierarchical tree of classes that matches a classification label of the training image; and backpropagating classification loss from output nodes of the convolutional neural network corresponding to the selected class and its ancestors in the hierarchical tree. For example, training 640 the convolutional neural network may include selecting a class in the hierarchical tree of classes that matches a classification label of the training image; and backpropagating classification loss from output nodes of the convolutional neural network, excepting nodes corresponding to descendants of the selected class in the hierarchical tree. In some implementations, the convolutional neural network lacks fully connected layers. For example, training 640 the convolutional neural network may include training the convolutional neural network using training images at multiple different resolutions by dynamically resizing the convolutional neural network.

The process 600 includes storing or transmitting 650 the convolutional neural network. For example, the convolutional neural network (e.g., the model or state of the convolutional neural network) may be transmitted 650 to an external device (e.g., a personal computing device) for display or storage. For example, the convolutional neural network may be stored 650 in memory of a processing apparatus (e.g., the processing apparatus 312 or the processing apparatus 362) for later use to detect and/or classify objects appearing in images. For example, the convolutional neural network may be transmitted 650 via the communications interface 322.

Figure 7:
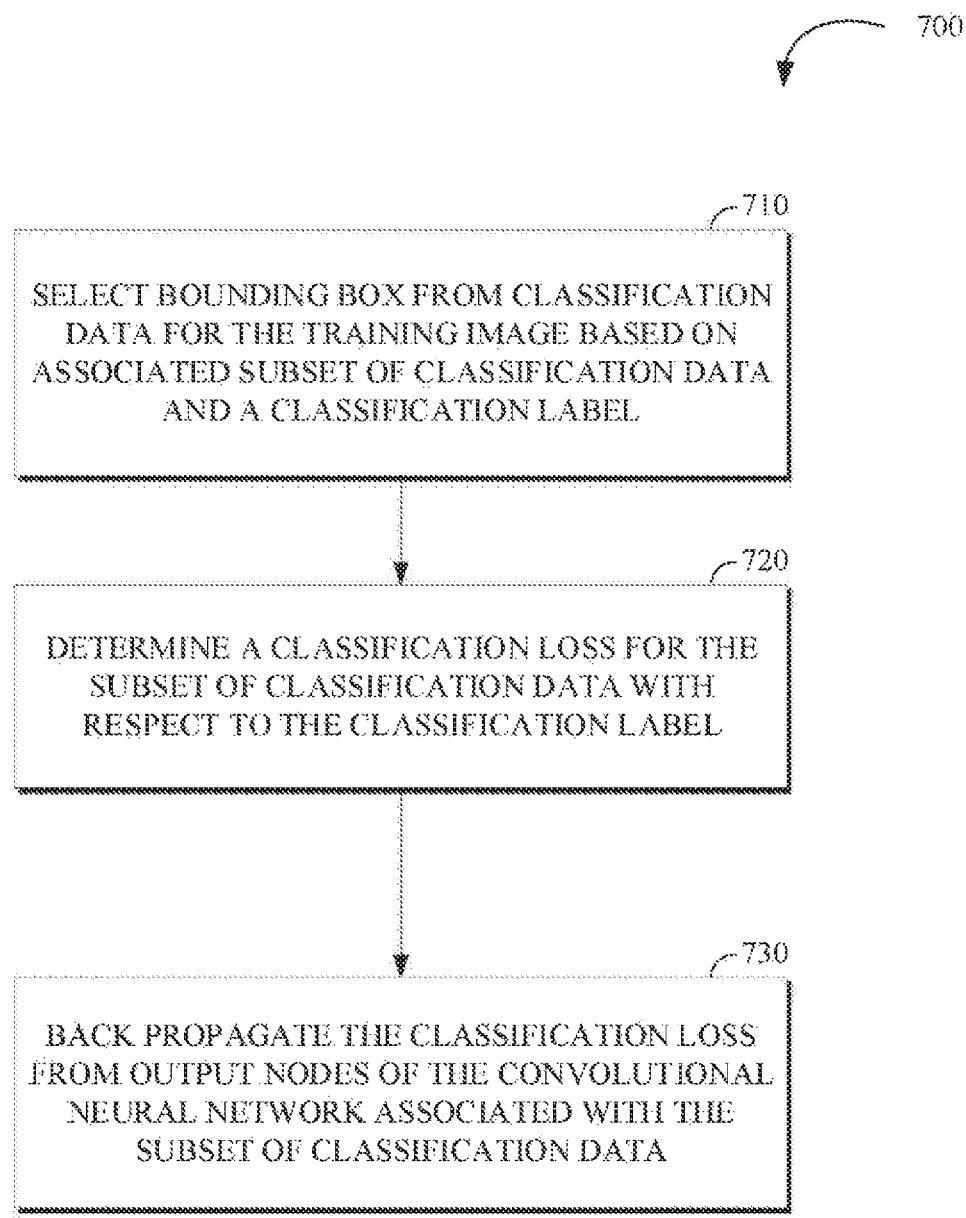
FIG. 7 is a flowchart of an example of a process for training a convolutional neural network for detection and classification of objects appearing in images using a training image associated with a classification label but lacking a localization label.

FIG. 7 is a flowchart of an example of a process 700 for training a convolutional neural network for detection and classification of objects appearing in images using a training image associated with a classification label but lacking a localization label. The process 700 includes selecting 710 a bounding box from localization data for the training image, wherein the bounding box is associated with a subset of classification data for the training image that best matches the classification label; determining 720 a classification loss for the subset of classification data with respect to the classification label; and backpropagating 730 the classification loss from output nodes of the convolutional neural network associated with the subset of classification data. For example, the process 700 may be implemented by the system 100 of FIG. 1, the system 300 of FIG. 3A, or the system 330 of FIG. 3B. For example, the process 700 may be implemented by an image capture device, such as the image capture device 310 shown in FIG. 3A. For example, the process 700 may be implemented by a personal computing device, such as the personal computing device 360. In some implementations, the convolutional neural network state or model that results from the process 700 is utilized for inference (e.g., for object detection and classification) by a different computing device than the computing device used to implement the process 700.

The process 700 includes selecting 710 a bounding box from localization data for the training image based on the classification label. The bounding box is associated with a subset of classification data for the training image that best matches the classification label. In some implementations, the matches of classification data for various bounding boxes to the classification label may be compared by determining matching metrics for respective bounding boxes and comparing the matching metrics. For example, the bounding box may be selected 710 by finding the bounding box with the highest prediction for the class identified by the classification label. In some implementations, the matching metric may be determined based on the prediction for the class identified by the classification label and the abjectness prediction for the bounding box (e.g., the estimated probability that an object is present in the bounding box). For example, the matching metric for a bounding box may be determined as the product of the predicted objectness and the prediction for the class identified by the classification label. The bounding box of the training image with the highest matching metric may be selected 710.

The process 700 includes determining 720 a classification loss for the subset of classification data with respect to the classification label. For example, the classification loss may be determined 720 as a square loss, a hinge loss, a logistic loss, or a cross-entropy loss of the subset of the classification data (e.g., a tuple of class predictions for the object of the selected 710 bounding box) with respect to the classification label.

The process 700 includes backpropagating 730 the classification loss from output nodes of the convolutional neural network associated with the subset of classification data. In some implementations, the convolutional neural network outputs classification data including predictions that correspond to respective classes that are nodes in a hierarchical tree of classes (as described in relation to FIGS. 9, 10A, and 10B). For example, backpropagating 730 the classification loss may include selecting a class in the hierarchical tree of classes that matches a classification label of the training image; and backpropagating classification loss from output nodes of the convolutional neural network corresponding to the selected class and its ancestors in the hierarchical tree. For example, backpropagating 730 the classification loss may include selecting a class in the hierarchical tree of classes that matches a classification label of the training image; and backpropagating classification loss from output nodes of the convolutional neural network, excepting nodes corresponding to descendants of the selected class in the hierarchical tree.

FIG. 8 is a diagram of an example of a bounding box 810 with dimension priors 820 (p_w, p_h) and location prediction constrained within a cell corresponding to a feature in a feature map for an image. The bounding box 810 is centered at the center point 812 that is determined based on predictions of a convolutional neural network (e.g., the convolutional neural network 110) according to Equation (2). The center point 812 is constrained to be located within a cell of the feature map with an upper left corner offset from the upper left corner of the image by cell x offset 830 (c_x) and the cell y offset 832 (c_y). In this example, the predictions of the convolutional neural network have resulted in a slight reduction in the width b_w and height b_h of the bounding box 810 from the dimension priors 820 p_w and p_h. In some implementations, multiple bounding boxes (e.g., five bounding boxes) are predicted for each cell of the feature map for an image.

FIG. 9 is a diagram of examples of prediction formats, comparing a hierarchical classification scheme 910 to a flat classification scheme 920. More specifically, FIG. 9 compares prediction using the 1000 mutually exclusive classes of the ImageNet dataset to prediction using WordTree—a hierarchical tree of classes. The example ImageNet model uses one large softmax 930 to predict a probability distribution across all 1000 classes. Using WordTree, multiple softmax operations (e.g., 940, 942, 944, 946, and 948) are performed over co-hyponyms.

The hierarchical tree of classes may be constructed using a language database, such as WordNet. For example, ImageNet labels are pulled from WordNet, a language database that structures concepts and how they relate. In WordNet, "Norfolk terrier" and "Yorkshire terrier" are both hyponyms of "terrier", which is a type of "hunting dog", which is a type of "dog", which is a "canine", etc. Most approaches to classification assume a flat structure to the labels; however, for combining datasets, structure can be useful. WordNet is structured as a directed graph, not a tree, because language is complex. For example, a "dog" is both a type of "canine" and a type of "domestic animal", which are both synsets in WordNet. Instead of using the full graph structure, the problem may be simplified by building a hierarchical tree of classes from the concepts in ImageNet. To build this tree, the visual nouns in ImageNet are examined to look at their paths through the WordNet graph to the root node, in this case "physical object". Many synsets only have one path through the graph, so first all of those paths are added to the hierarchical tree of classes. Then the remaining concepts are iteratively examined and the paths added to grow the hierarchical tree of classes by as little as feasible. So, if a concept has two paths to the root and one path would add three edges to the hierarchical tree of classes and the other would add only one edge, the shorter path is chosen. The final result is WordTree, a hierarchical tree of visual concepts (e.g., a hierarchical tree of object classes). To perform classification with WordTree, conditional probabilities are predicted at every node for the probability of each hyponym of that synset given that synset. For example, at the "terrier" node the convolutional neural network predicts:

Pr(Norfolk terrier I terrier)
Pr(Yorkshire terrier I terrier)
Pr(Bedlington terrier I terrier)

An absolute probability for a particular node in the WordTree may be determined by following the path through the tree to the root node and multiplying conditional probabilities along the path. For example, to determine whether a Norfolk terrier appears in an image, compute:

$$Pr(\text{Norfolk terrier}) = Pr(\text{Norfolk terrier} | \text{terrier}) *$$
$$Pr(\text{terrier} | \text{hunting dog})$$
$$\ldots *$$
$$Pr(\text{mammal} | \text{animal}) *$$
$$Pr(\text{animal} | \text{physical object})$$

For classification purposes, it is assumed that the image (or the bounding box) contains an object (i.e., Pr(physical object)=1).

For example, a convolutional neural network (e.g., the convolutional neural network 110) may be modified to use a hierarchical tree of classes called WordTree1k that is built using the 1000 class ImageNet. To build WordTree1k, all of the intermediate nodes are added in, which expands the label space from 1000 to 1369. During training, ground truth labels are propagated up the tree so that if an image is labelled as a "Norfolk terrier" it also gets labelled as a "dog" and a "mammal", etc. To compute the conditional probabilities, the convolutional neural network predicts a vector of 1369 values and softmax is computed over all synsets that are hyponyms of the same concept (see FIG. 8). Using the same training parameters as before, this hierarchical convolutional neural network may achieve 71.9% top-1 accuracy and 90.4% top-5 accuracy. Despite adding 369 additional concepts and having the convolutional neural network predict a tree structure, the accuracy only drops marginally. Performing classification in this manner also has some benefits. Performance may degrade gracefully on new or unknown object categories. For example, if the network sees a picture of a dog but is uncertain what type of dog it is, it will still predict "dog" with high confidence but have lower confidences spread out among the hyponyms.

This formulation also works for detection. Now, instead of assuming every image has an object, an objectness prediction of the convolutional neural network can be used to provide the value of Pr(physical object). The detector (e.g., the system 100) predicts a bounding box and the hierarchical tree of probabilities. The hierarchical tree of probabilities may be traversed down, taking the highest confidence path at every split until some threshold is reached, and then that object class is predicted.

Figure 10A:
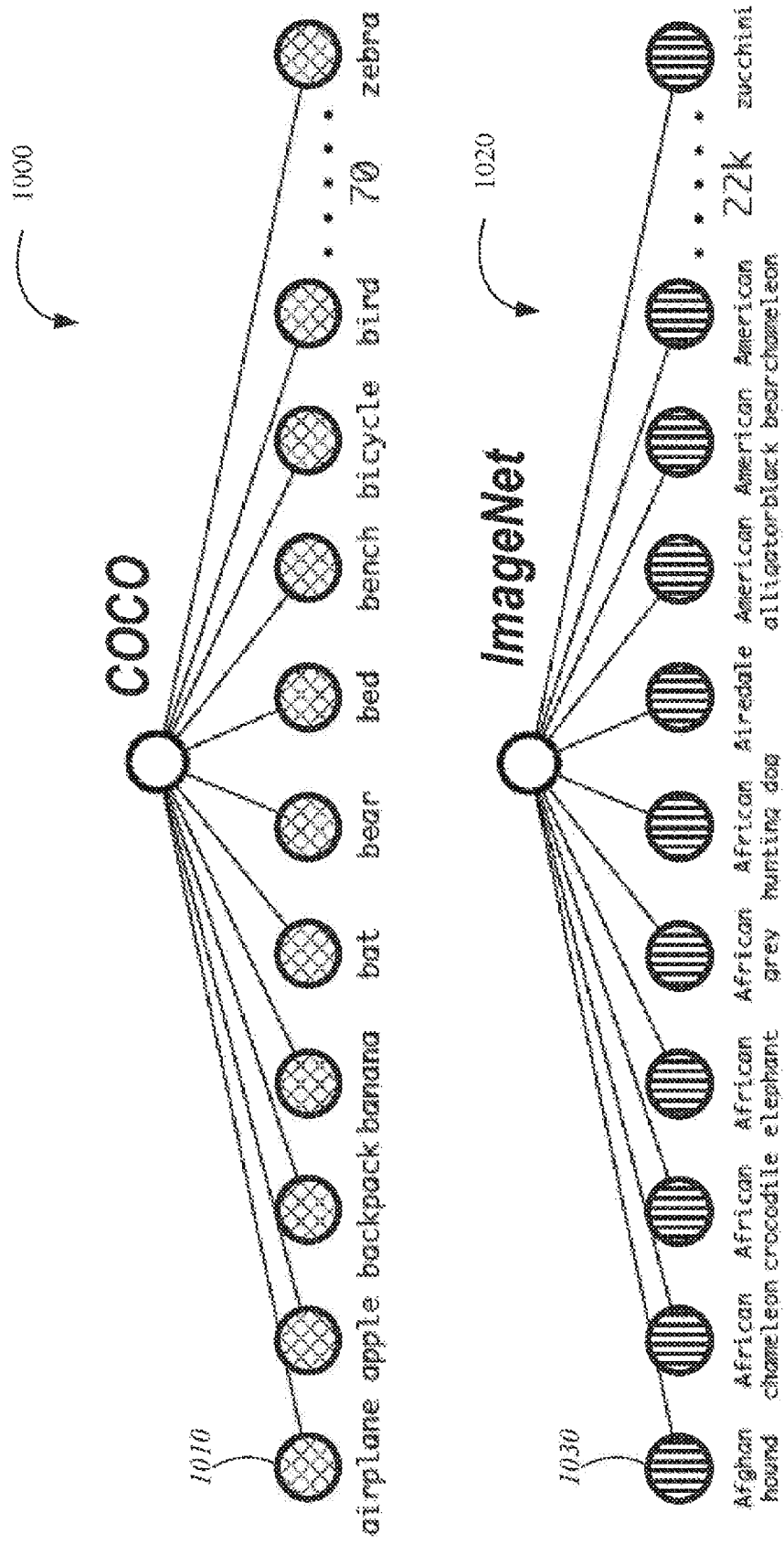
FIG. 10A is a diagram of examples of single level tree representations of classes represented in two training datasets of images with different class labeling schemes.
Figure 10B:
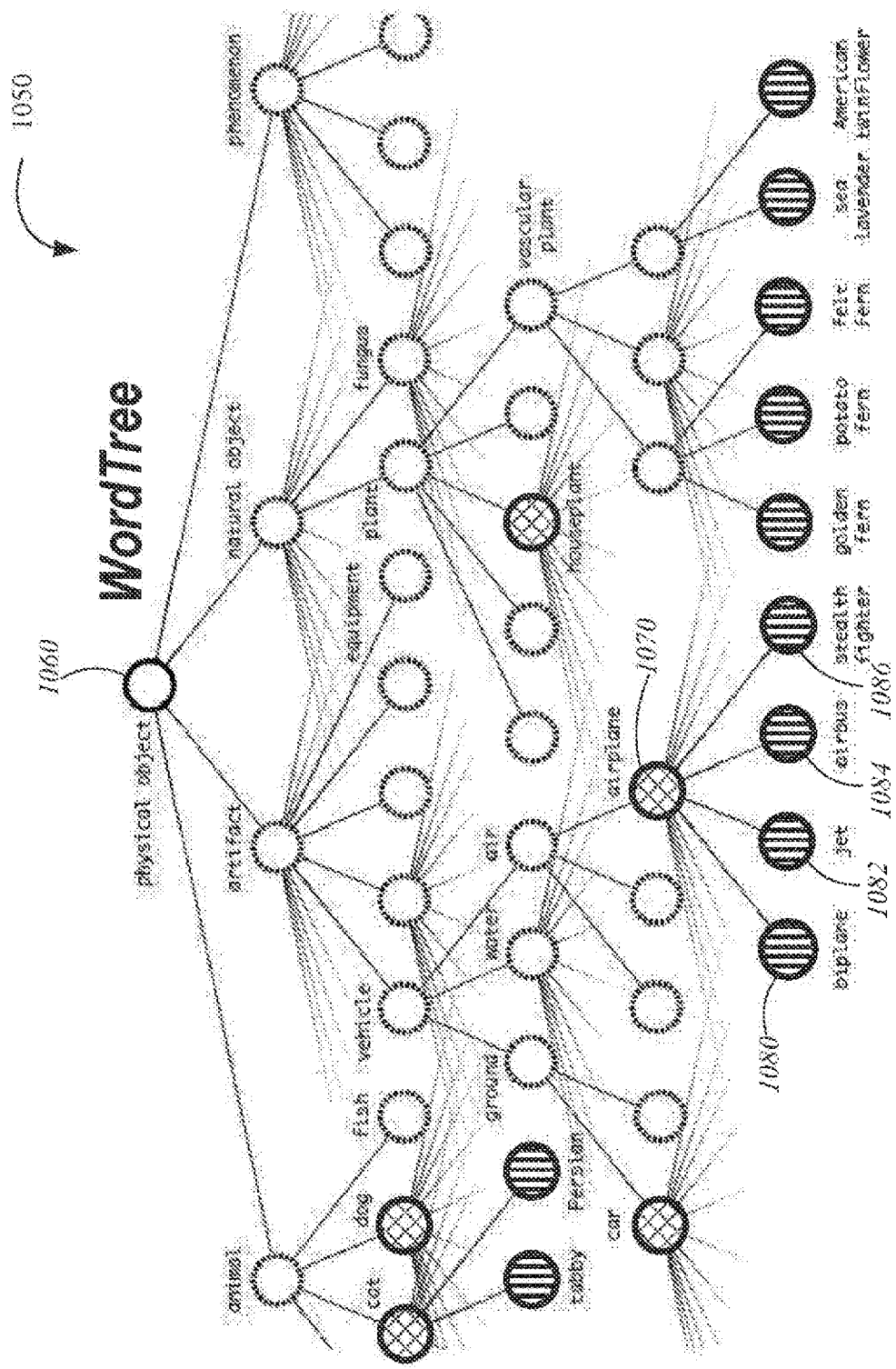
FIG. 10B is a diagram of an example of a hierarchical tree of classes including classes from multiple training datasets of images with different class labeling schemes.

The hierarchical tree of classes—WordTree—can be used to combine multiple datasets together in a sensible fashion. The classes represented in the datasets may be mapped to synsets in the tree. FIGS. 10A and 10B illustrate an example of using WordTree to combine the labels from the ImageNet dataset and the COCO dataset. WordNet is extremely diverse, so this technique can be used with most datasets.

FIG. 10A is a diagram of examples of single level tree representations of classes represented in two training datasets of images with different class labeling schemes. The first flat tree 1000 represents classes used in the COCO dataset for object detection. The tree 1000 consists of 70 leaf nodes corresponding to the 70 mutually exclusive classes used by the COCO dataset. For example, the node 1010 corresponds to the object class "airplane". The second flat tree 1020 represents classes used in the ImageNet dataset for classification. The tree 1020 consists of over 22,000 leaf nodes corresponding to the mutually exclusive classes used by the ImageNet dataset. For example, the node 1030 corresponds to the object class "Afghan hound".

FIG. 10B is a diagram of an example of a hierarchical tree 1050 of classes including classes from multiple training datasets of images with different class labeling schemes. The hierarchical tree 1050 includes a root node 1060 that corresponds to the class of all physical objects. The root node 1060 has a large number of descendant nodes, only a small portion of which are shown in FIG. 10B for clarity. For example, the hierarchical tree 1050 includes a branch node 1070 corresponding to the object class "airplane". The "airplane" class is used in the COCO dataset. The branch node 1070 has four descendant leaf nodes 1080, 1082, 1084, and 1086 that correspond to the object classes "biplane", "jet", "airbus", and "stealth fighter", respectively. These four classes corresponding to the leaf nodes 1080, 1082, 1084, and 1086 correspond to classes that are used in the ImageNet dataset. Diverse datasets may be combined using the hierarchical tree 1050, which is called the WordTree hierarchy. The hierarchical tree 1050 of classes is built using the WordNet concept graph. Then datasets can be merged together by mapping the classes in the dataset to synsets in the tree. FIG. 10B presents a simplified view of WordTree for illustration purposes.

In some implementations, joint classification and detection are implemented with a convolutional neural network (e.g., the convolutional neural network 110). Now datasets can be combined using WordTree and used to train a joint model on classification and detection. In order to train an extremely large-scale detector, a combined dataset is created using the COCO detection dataset and the top 9000 classes from the full ImageNet release. Classes from the ImageNet detection challenge that were not already included may be added. The corresponding WordTree for this dataset has 9418 classes. ImageNet is a much larger dataset, so the dataset is balanced somewhat by oversampling the COCO dataset so that ImageNet is only larger by a factor of 4:1.

For example, using this combined dataset, a convolutional neural network (e.g., the convolutional neural network 110) is trained. In this example, only 3 priors are used instead of 5 to limit the output size. When the convolutional neural network sees a detection, image loss is backpropagated as normal. For classification loss, loss may be backpropagated at or above the corresponding level of the label. For example, if the label is "dog", we do not assign any error to predictions further down in the tree (e.g., "German Shepherd" versus "Golden Retriever"), because we do not have that information.

In some implementations, when the convolutional neural network trains using a classification image, only classification loss is backpropagated. For example, the bounding box that predicts the highest probability for that class may be found, and the classification loss may be backpropagated on just its predicted tree. In some implementations, it is assumed that the predicted bounding box overlaps what would be the ground truth label by at least 0.3 IOU, and we also backpropagate objectness loss based on this assumption. Using this joint training, the convolutional neural network learns to find objects in images using the detection data in COCO, and it learns to classify a wide variety of these objects using data from ImageNet.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. A system comprising:
a memory; and
at least one processor configured to:
apply a convolutional neural network to an image to obtain classification data to classify an object depicted in the image, the classification data comprising predictions corresponding to respective classes that are nodes in a hierarchical tree of classes; and
annotate the image based on the classification data.

2. The system of claim 1, in which the convolutional neural network has been trained with a training image with a classification label and lacking a localization label by:
selecting a bounding box from localization data for the training image, wherein the bounding box is associated with a subset of classification data for the training image that best matches the classification label;
determining a classification loss for the subset of classification data with respect to the classification label; and
backpropagating the classification loss from output nodes of the convolutional neural network associated with the subset of classification data.

3. The system of claim 1, in which the convolutional neural network has been trained in part using training images with associated localization labels and classification labels and has been trained in part using training images with associated classification labels that lack localization labels and the at least one processor is configured to annotate the image based on the classification data and localization data obtained from the convolutional neural network.

4. The system of claim 3, in which the localization data includes one or more bounding boxes that are constrained to be centered within a region of the image corresponding to a cell of a feature map for the image, and coordinates of the one or more bounding boxes within the region are predictions of the convolutional neural network included in the localization data.

5. The system of claim 1, in which the predictions corresponding to classes that are siblings in the hierarchical tree are related by a softmax function.

6. The system of claim 1, in which the convolutional neural network has been trained with a training image by:
selecting a class in the hierarchical tree of classes that matches a classification label of the training image; and
backpropagating classification loss from output nodes of the convolutional neural network corresponding to the selected class and its ancestors in the hierarchical tree.

7. The system of claim 1, in which the convolutional neural network has been trained with a training image by:
selecting a class in the hierarchical tree of classes that matches a classification label of the training image; and
backpropagating classification loss from output nodes of the convolutional neural network, excepting nodes corresponding to descendants of the selected class in the hierarchical tree.

8. The system of claim 1, in which the at least one processor is further configured to:
select a class based on the classification data and the hierarchical tree by starting at a root of the hierarchical tree and iteratively selecting a descendant class with the highest corresponding prediction of the classification data from among sibling classes until a leaf class is selected or the prediction values of all descendants of the selected class are below a threshold; and
annotate the image with the selected class.

9. The system of claim 1, in which the convolutional neural network has been trained with a training image with a classification label and lacking a localization label by:
up-sampling the training image to a higher resolution to match a resolution of training images in a corpus of object detection training images that are associated with classification labels and localization labels.

10. The system of claim 1, in which the convolutional neural network has been trained using priors for a set of bounding boxes that were determined by a clustering analysis of bounding boxes in localization labels from a corpus of training images, and the clustering analysis used a distance metric based on intersection over union.

11. The system of claim 1, in which the convolutional neural network lacks fully connected layers and has been trained using training images at multiple different resolutions by dynamically resizing the convolutional neural network.

12. The system of claim 1, comprising:
an image sensor configured to capture the image; and
a fastening article attached to the image sensor and configured to hold the image sensor in place on a portion of a human body.

13. The system of claim 1, further comprising:
an image sensor configured to capture the image, in which the image sensor is attached to the at least one processor.

14. The system of claim 1, wherein the at least one processor is further configured to:
store, display, or transmit the annotated image.

15. A method comprising:
applying a convolutional neural network to an image to obtain at least one of: localization data to detect an object depicted in the image, or classification data to classify the object depicted in the image, in which the convolutional neural network lacks fully connected layers and has been trained at least in part using training images at multiple different resolutions by dynamically resizing the convolutional neural network; and
annotating the image based on the at least one of the localization data or the classification data.

16. The method of claim 15, in which annotating the image based on the at least one of the localization data or the classification data comprises:
selecting a bounding box from the localization data;
overlaying a border of the bounding box on the image;
selecting a class based on a portion of the classification data associated with the bounding box; and
overlaying text corresponding to the class on the image.

17. The method of claim 15, in which the convolutional neural network has been trained further at least in part with a training image with a classification label and lacking a localization label by:
selecting a bounding box from localization data for the training image, wherein the bounding box is associated with a subset of classification data for the training image that best matches the classification label;

determining a classification loss for the subset of classification data with respect to the classification label; and
backpropagating the classification loss from output nodes of the convolutional neural network associated with the subset of classification data.

18. The method of claim 15, in which the convolutional neural network outputs classification data including predictions that correspond to respective classes that are nodes in a hierarchical tree of classes.

19. The method of claim 18, in which the convolutional neural network has been trained further at least in part with a training image by:
selecting a class in the hierarchical tree of classes that matches a classification label of the training image; and
backpropagating classification loss from output nodes of the convolutional neural network corresponding to the selected class and its ancestors in the hierarchical tree.

20. The method of claim 18, in which the convolutional neural network has been trained further at least in part with a training image by:
selecting a class in the hierarchical tree of classes that matches a classification label of the training image; and
backpropagating classification loss from output nodes of the convolutional neural network, excepting nodes corresponding to descendants of the selected class in the hierarchical tree.

21. The method of claim 18, comprising:
selecting a class based on the classification data and the hierarchical tree by starting at a root of the hierarchical tree and iteratively selecting a descendant class with the highest corresponding prediction of the classification data from among sibling classes until a leaf class is selected or the prediction values of all descendants of the selected class are below a threshold; and
annotating the image based on the selected class.

22. The method of claim 15, in which the localization data includes one or more bounding boxes that are constrained to be centered within a region of the image corresponding to a cell of a feature map for the image, and coordinates of the one or more bounding boxes within the region are predictions of the convolutional neural network included in the localization data.

23. The method of claim 15, further comprising:
storing, displaying, or transmitting the annotated image.

24. A non-transitory machine-readable medium comprising instructions that when executed by one or more processors, causes the one or more processors to perform operations comprising:
applying a convolutional neural network to an image to obtain classification data to classify an object depicted in the image, the classification data comprising predictions corresponding to respective classes that are nodes in a hierarchical tree of classes; and
annotating the image based on the classification data.

25. The non-transitory machine-readable medium of claim 24, wherein the instructions, when executed by the one or more processors, further cause the one or more processors to perform operations comprising:
storing, displaying, or transmitting the annotated image.

26. The non-transitory machine-readable medium of claim 24, in which the convolutional neural network has been trained with a training image by:
selecting a class in the hierarchical tree of classes that matches a classification label of the training image; and
backpropagating classification loss from output nodes of the convolutional neural network corresponding to the selected class and its ancestors in the hierarchical tree.

27. The non-transitory machine-readable medium of claim 24, in which the convolutional neural network has been trained with a training image by:
selecting a class in the hierarchical tree of classes that matches a classification label of the training image; and
backpropagating classification loss from output nodes of the convolutional neural network, excepting nodes corresponding to descendants of the selected class in the hierarchical tree.

28. The non-transitory machine-readable medium of claim 24, comprising:
selecting a class based on the classification data and the hierarchical tree by starting at a root of the hierarchical tree and iteratively selecting a descendant class with the highest corresponding prediction of the classification data from among sibling classes until a leaf class is selected or the prediction values of all descendants of the selected class are below a threshold; and
annotating the image based on the selected class.

29. The non-transitory machine-readable medium of claim 24, in which the convolutional neural network lacks fully connected layers and has been trained using training images at multiple different resolutions by dynamically resizing the convolutional neural network.

* * * * *